United States Patent
Margulies et al.

(10) Patent No.: US 8,885,812 B2
(45) Date of Patent: *Nov. 11, 2014

(54) DYNAMIC CUSTOMER SATISFACTION ROUTING

(75) Inventors: Edwin Kenneth Margulies, Las Vegas, NV (US); Eli Ben Borodow, San Diego, CA (US); Ran Ezerzer, San Diego, CA (US); Ali Aljane, San Diego, CA (US); William Scott Seebauer, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1083 days.

This patent is subject to a terminal disclaimer.

(21) Appl. No.: 11/376,486

(22) Filed: Mar. 15, 2006

(65) Prior Publication Data

US 2006/0262922 A1 Nov. 23, 2006

Related U.S. Application Data

(60) Provisional application No. 60/682,180, filed on May 17, 2005.

(51) Int. Cl.
*H04M 3/00* (2006.01)
*H04M 3/523* (2006.01)
*G06Q 30/02* (2012.01)

(52) U.S. Cl.
CPC ............ *H04M 3/5232* (2013.01); *G06Q 30/02* (2013.01); *H04M 3/5233* (2013.01)
USPC ................................ 379/265.03; 379/265.02

(58) Field of Classification Search
USPC ............ 379/265.06, 265.09, 265.02; 705/11, 705/10; 707/530; 709/224, 227
See application file for complete search history.

(56) References Cited

U.S. PATENT DOCUMENTS 5,185,780 A 2/1993 Leggett et al.
5,299,260 A 3/1994 Shaio
(Continued)

FOREIGN PATENT DOCUMENTS

EP 0806858 11/1997
EP 0920224 6/1999
(Continued)

OTHER PUBLICATIONS

Treasury Board of Canada, Guidelines for Core Key Performance Indicators, Sep. 2004, p. 8, 17, 18, 26, 29, 30.*

(Continued)

*Primary Examiner* — Sonia Gay
(74) *Attorney, Agent, or Firm* — Meyer IP Law Group

(57) ABSTRACT

Embodiments of the present invention provide a robust customer service environment employing "Key Performance Indicators" (KPIs), which represent both customer interaction experiences and also the overall efficacy of agent performance on an interaction-by-interaction basis. A KPI can be any metric for measuring a category of information related to a call center interaction, e.g., customer satisfaction or agent ability/performance. Input from customer experiences is catalogued and linked to one or more KPIs. Key performance indicators are associated with a key performance indicator template, which is linked with a project comprising routing rules, triggers, and specific actions that are driven as a result of the key performance indicator template. The project may be a phone/IVR project, Web CallBack project, email project, or a Chat project. Execution of the key performance indicator template triggers pre-, during, and/or post-call, -chat, -CallBack, or -email input from a call center user.

16 Claims, 17 Drawing Sheets

(56) References Cited

U.S. PATENT DOCUMENTS

| | | | |
|---|---|---|---|
| 5,479,487 A | 12/1995 | Hammond | |
| 5,535,256 A | 7/1996 | Maloney et al. | |
| 5,557,515 A | 9/1996 | Abbruzzese et al. | |
| 5,563,937 A | 10/1996 | Bruno et al. | |
| 5,590,188 A | 12/1996 | Crockett | |
| 5,684,870 A | 11/1997 | Maloney et al. | |
| 5,703,943 A | 12/1997 | Otto | |
| 5,706,507 A | 1/1998 | Schloss | |
| 5,742,675 A | 4/1998 | Kilander et al. | |
| 5,774,660 A | 6/1998 | Brendel et al. | |
| 5,774,670 A | 6/1998 | Montulli | |
| 5,790,650 A | 8/1998 | Dunn et al. | |
| 5,822,306 A | 10/1998 | Catchpole | |
| 5,825,869 A | 10/1998 | Brooks et al. | |
| 5,825,870 A | 10/1998 | Miloslavsky | |
| 5,826,252 A | 10/1998 | Wolters, Jr. et al. | |
| 5,841,854 A | 11/1998 | Schumacher et al. | |
| 5,889,799 A | 3/1999 | Grossman et al. | |
| 5,895,471 A | 4/1999 | King et al. | |
| 5,903,641 A | 5/1999 | Tonisson | |
| 5,914,713 A | 6/1999 | Nario et al. | |
| 5,923,745 A | 7/1999 | Hurd | |
| 5,940,496 A | 8/1999 | Gisby et al. | |
| 5,943,416 A | 8/1999 | Gisby | |
| 5,953,406 A | 9/1999 | LaRue et al. | |
| 5,960,404 A | 9/1999 | Chaar et al. | |
| 5,978,465 A | 11/1999 | Corduroy et al. | |
| 5,982,873 A | 11/1999 | Flockhart et al. | |
| 5,999,911 A | 12/1999 | Berg et al. | |
| 6,012,088 A | 1/2000 | Li et al. | |
| 6,014,688 A | 1/2000 | Venkatraman et al. | |
| 6,029,141 A | 2/2000 | Bezos et al. | |
| 6,044,355 A | 3/2000 | Crockett et al. | |
| 6,046,762 A | 4/2000 | Sonesh et al. | |
| 6,070,242 A | 5/2000 | Wong et al. | |
| 6,073,178 A | 6/2000 | Wong et al. | |
| 6,134,530 A | 10/2000 | Bunting et al. | |
| 6,163,607 A * | 12/2000 | Bogart et al. | 379/266.01 |
| 6,173,053 B1 | 1/2001 | Bogart et al. | |
| 6,173,312 B1 | 1/2001 | Atarashi et al. | |
| 6,175,564 B1 | 1/2001 | Miloslavsky et al. | |
| 6,185,288 B1 | 2/2001 | Wong | |
| 6,188,761 B1 | 2/2001 | Dickerman et al. | |
| 6,201,804 B1 | 3/2001 | Kikinis | |
| 6,225,995 B1 | 5/2001 | Jacobs et al. | |
| 6,226,748 B1 | 5/2001 | Bots et al. | |
| 6,229,888 B1 | 5/2001 | Miloslavsky | |
| 6,230,197 B1 | 5/2001 | Beck et al. | |
| 6,233,332 B1 | 5/2001 | Anderson et al. | |
| 6,243,092 B1 | 6/2001 | Okita et al. | |
| 6,259,909 B1 | 7/2001 | Ratayczak et al. | |
| 6,263,066 B1 | 7/2001 | Shtivelman et al. | |
| 6,295,353 B1 | 9/2001 | Flockhart et al. | |
| 6,295,551 B1 | 9/2001 | Roberts et al. | |
| 6,298,045 B1 | 10/2001 | Pang et al. | |
| 6,298,356 B1 | 10/2001 | Jawahar et al. | |
| 6,308,188 B1 | 10/2001 | Bernardo | |
| 6,363,145 B1 * | 3/2002 | Shaffer et al. | 379/265.02 |
| 6,373,836 B1 | 4/2002 | Deryugin et al. | |
| 6,389,400 B1 | 5/2002 | Bushey et al. | |
| 6,424,624 B1 | 7/2002 | Galand et al. | |
| 6,487,290 B1 | 11/2002 | Le Grand | |
| 6,487,291 B1 | 11/2002 | Walker et al. | |
| 6,493,447 B1 * | 12/2002 | Goss et al. | 379/265.09 |
| 6,493,695 B1 | 12/2002 | Pickering et al. | |
| 6,496,867 B1 | 12/2002 | Beser et al. | |
| 6,535,600 B1 | 3/2003 | Fisher et al. | |
| 6,553,113 B1 | 4/2003 | Dhir et al. | |
| 6,570,980 B1 | 5/2003 | Baruch | |
| 6,574,331 B1 | 6/2003 | Forsythe et al. | |
| 6,597,685 B2 | 7/2003 | Miloslavsky et al. | |
| 6,606,740 B1 | 8/2003 | Lynn et al. | |
| 6,618,710 B1 | 9/2003 | Zondervan et al. | |
| 6,625,141 B1 | 9/2003 | Glitho et al. | |
| 6,628,777 B1 | 9/2003 | McIllwaine | |
| 6,661,882 B1 | 12/2003 | Muir et al. | |
| 6,665,395 B1 | 12/2003 | Busey et al. | |
| 6,673,104 B2 | 1/2004 | Barry | |
| 6,674,713 B1 | 1/2004 | Berg et al. | |
| 6,674,852 B1 | 1/2004 | Hamilton | |
| 6,681,010 B1 | 1/2004 | Anderson et al. | |
| 6,697,858 B1 | 2/2004 | Ezerzer et al. | |
| 6,704,410 B1 | 3/2004 | McFarlane et al. | |
| 6,718,366 B2 | 4/2004 | Johnstone et al. | |
| 6,724,887 B1 * | 4/2004 | Eilbacher et al. | 379/265.03 |
| 6,732,178 B1 | 5/2004 | Van Horne et al. | |
| 6,735,299 B2 | 5/2004 | Krimstock | |
| 6,744,858 B1 | 6/2004 | Ryan et al. | |
| 6,745,235 B2 | 6/2004 | Baca et al. | |
| 6,751,310 B1 | 6/2004 | Crossley | |
| 6,760,324 B1 | 7/2004 | Scott et al. | |
| 6,763,104 B1 | 7/2004 | Judkins et al. | |
| 6,771,760 B1 | 8/2004 | Vortman et al. | |
| 6,779,020 B1 | 8/2004 | Henrick | |
| 6,789,876 B2 | 9/2004 | Barclay et al. | |
| 6,798,768 B1 | 9/2004 | Gallick et al. | |
| 6,801,620 B2 | 10/2004 | Smith et al. | |
| 6,865,268 B1 | 3/2005 | Matthews et al. | |
| 6,879,685 B1 | 4/2005 | Peterson et al. | |
| 6,895,558 B1 | 5/2005 | Loveland | |
| 6,904,161 B1 | 6/2005 | Becker et al. | |
| 6,910,074 B1 | 6/2005 | Amin et al. | |
| 6,912,272 B2 | 6/2005 | Kirk | |
| 6,934,379 B2 | 8/2005 | Falcon et al. | |
| 6,970,829 B1 | 11/2005 | Leamon | |
| 7,039,176 B2 | 5/2006 | Borodow et al. | |
| 7,062,031 B2 | 6/2006 | Becerra et al. | |
| 7,069,536 B2 | 6/2006 | Yaung | |
| 7,085,834 B2 | 8/2006 | Delany et al. | |
| 7,103,171 B1 | 9/2006 | Annadata | |
| 7,155,720 B2 | 12/2006 | Casati | |
| 7,228,547 B2 | 6/2007 | Yaung | |
| 7,254,641 B2 | 8/2007 | Broughton et al. | |
| 7,289,966 B2 | 10/2007 | Ouchi | |
| 7,305,082 B2 | 12/2007 | Elazar et al. | |
| 7,321,298 B2 | 1/2008 | Judkins et al. | |
| 7,382,773 B2 | 6/2008 | Schoeneberger et al. | |
| 7,406,575 B2 | 7/2008 | Lam | |
| 7,454,466 B2 | 11/2008 | Bellotti | |
| 7,568,001 B2 | 7/2009 | McPartlan et al. | |
| 7,581,011 B2 | 8/2009 | Teng | |
| 7,647,595 B2 | 1/2010 | Chandrasekaran | |
| 7,734,032 B1 | 6/2010 | Kiefhaber et al. | |
| 7,792,278 B2 | 9/2010 | Watson et al. | |
| 7,792,773 B2 | 9/2010 | McCord et al. | |
| 7,949,588 B2 | 5/2011 | Willis | |
| 2001/0011228 A1 | 8/2001 | Shenkman | |
| 2001/0024497 A1 | 9/2001 | Campbell et al. | |
| 2002/0001300 A1 | 1/2002 | Miloslavsky et al. | |
| 2002/0029161 A1 | 3/2002 | Brodersen | |
| 2002/0032706 A1 * | 3/2002 | Perla et al. | 707/530 |
| 2002/0038309 A1 | 3/2002 | Perkins et al. | |
| 2002/0067822 A1 | 6/2002 | Cohen et al. | |
| 2002/0091817 A1 * | 7/2002 | Hill et al. | 709/224 |
| 2002/0101979 A1 | 8/2002 | Borodow | |
| 2002/0120459 A1 | 8/2002 | Dick et al. | |
| 2003/0009373 A1 | 1/2003 | Ensing et al. | |
| 2003/0018508 A1 | 1/2003 | Schwanke | |
| 2003/0018702 A1 | 1/2003 | Broughton et al. | |
| 2003/0023675 A1 | 1/2003 | Ouchi et al. | |
| 2003/0069780 A1 | 4/2003 | Hailwood et al. | |
| 2003/0093533 A1 * | 5/2003 | Ezerzer et al. | 709/227 |
| 2003/0101082 A1 | 5/2003 | Volpe | |
| 2003/0174830 A1 | 9/2003 | Boyer et al. | |
| 2003/0200527 A1 | 10/2003 | Lynn | |
| 2004/0057569 A1 | 3/2004 | Busey et al. | |
| 2004/0101127 A1 | 5/2004 | Dezonno | |
| 2004/0141508 A1 | 7/2004 | Schoeneberger et al. | |
| 2004/0210475 A1 | 10/2004 | Starnes et al. | |
| 2004/0249650 A1 | 12/2004 | Freedman et al. | |
| 2005/0010475 A1 | 1/2005 | Perkowski et al. | |
| 2005/0021713 A1 | 1/2005 | Dugan et al. | |
| 2005/0043986 A1 * | 2/2005 | McConnell et al. | 705/11 |
| 2005/0080705 A1 | 4/2005 | Chaganti | |

(56) References Cited

U.S. PATENT DOCUMENTS

| | | | |
|---|---|---|---|
| 2005/0125487 A1 | 6/2005 | O'Connor et al. | |
| 2006/0002540 A1* | 1/2006 | Kreiner et al. | 379/265.02 |
| 2006/0062374 A1* | 3/2006 | Gupta | 379/265.06 |
| 2006/0143034 A1 | 6/2006 | Rothermel et al. | |
| 2006/0179064 A1 | 8/2006 | Paz et al. | |
| 2006/0262922 A1 | 11/2006 | Margulies | |
| 2007/0239515 A1* | 10/2007 | Hernandez et al. | 705/10 |

FOREIGN PATENT DOCUMENTS

| | | | |
|---|---|---|---|
| EP | 1073249 | 1/2001 | |
| JP | 11-317817 | 11/1999 | |
| JP | 2000-078292 A | 3/2000 | |
| JP | 2002-007354 | 1/2002 | |
| JP | 2003-203148 A | 7/2003 | |
| JP | 2003-316944 A | 11/2003 | |
| JP | 2004-015127 A | 1/2004 | |
| JP | 2005-504452 T | 2/2005 | |
| WO | WO 98/53593 | 11/1998 | |
| WO | 0007135 | 2/2000 | |
| WO | 01/54389 | 7/2001 | |
| WO | WO 01/50336 A1 | 7/2001 | |
| WO | WO 02/09399 A2 | 1/2002 | |
| WO | 02/27571 | 4/2002 | |
| WO | WO0227571 * | 4/2002 | G06F 17/60 |
| WO | 02/50717 | 6/2002 | |
| WO | WO 02/065741 A2 | 8/2002 | |
| WO | WO 03/061242 A1 | 7/2003 | |

OTHER PUBLICATIONS

Telephony@Work, Inc. "CALLCENTER Anywhere, The Complete Contact Center Solution", Administration Manager V.3.0 User Manual, Multi Tenant Version: CR 1998, 1999, 2000.
Tian Jing, "Introduction to routing policy of call center," Editorial Dept. Tianjin Communication Technol, Jun. 2003, No. 2, pp. 33-5 (in Chinese language).
Wisiorowski, "Siemens call center solution-Flex Routing," SIGMA NOT, 1999 vol. 72, No. 2, pp. 108-109 (in Polish language).
Feinberg et al., "Operational determinants of caller satisfaction in the call center," International Journal of Service Industry Management, 2000, vol. 11, No. 2, pp. 131-141.
Belhajjame et al., "A Flexible Workflow model for process oriented applications", proceeding of 2nd International Conference on Web Information Systems Engineering (Kyoto, Japan), vol. 1, Dec. 3, 2001-Dec. 6, 2001, pp. 72-80, XP002588475.
Stohr et al., "Workflow automation overview and research issues", Information Systems Frontiers, Kluwer Dordrechnt, NL, vol. 3, No. 3, Sep. 1, 2001, pp. 281-296, ISSN: 1387-3326.
US Office Action for related copending U.S. Appl. No. 11/277,125; dated Apr. 4, 2011.
US Office Action for related copending U.S. Appl. No. 11/277,125; dated May 3, 2010.
Workflow Template; Using the WFT Development Environment Template Software, 1998.
Oft, Marcus Conceptual Design and Implementation of a Graphical Workflow-Modeling Editor in the Context of Distribute Groupware-Databases, University of Paderborn, May 1994.
US Office Action for related copending U.S. Appl. No. 11/277,125; dated Aug. 26, 2010.
Avaya Communication "CentreVu Advocate, Release 9, User Guide", Dec. 2000, Issue 1, Comcode 108869025, 234 pages.
"Teamware Flow 3.1 User's Guide", Third Edition, Apr. 2000, Document No. PM16307EE, 164 pages.
IBM, "IBM MQSeries Workflow, Concepts and Architecture, Version 33", Fourth Edition, Mar. 2001, 69 pages.
ProQuest, "JetForm's Universally Deployable Workflow", 3 pages.
US Office Action for related copending U.S. Appl. No. 11/277,125; dated Dec. 2, 2010.
Steul, "CentreVu Advocate, Release 9, User Guide", Dec. 2000, Issue 1, Comcode 108869025, 234 pages.
Steul, D., Redifining the Call Center: Customer Service on the Internet, Alcatel Telecommunications Review, Mar. 2000, 5 pages.
Brown, D.E., The Interaction Center Platform—White Paper Interactive Intelligence, Apr. 6, 2001, 31 pages.
BEA WebLogic Process Integrator—Learning to Use BEA WebLogic Process Integrator, BEA, Jul. 2001, 212 pages.
Seibel eBusiness Applications—Seibel Workflow Administration Guide, Seibel 2000, Jun. 2001, 254 pages.
CentreVu Advocate—Release 9 User, Avaya Communication, Dec. 2000, 234 pages.
van den Broek, Dian, Monitoring and surveillance in call centers: some responses from Australian workers Labor & Industry, vol. 12, No. 3, Apr. 2002, 15 pages.
Lesaint, David et al., Dynamic Workflow Scheduling for British Telecommunications plc Interfaces, vol. 30, Jan.-Feb. 2000, 8 pages.
Fukunaga, Alex et al., Staff Scheduling for Inbout Call Centers and Customer Contact Centers American Association for Artificial Intelligence, 2002, 9 pages.
Oracle Telephone Manager—Concepts and Procedures—Release 11i, Oracle, Apr. 2000.
Oracle Scripting—Concepts and Procedures—Release 11i, Oracle, Apr. 2000.
Oracle Telephony Manager—Implementation Guide—Release 11i, Oracle, Nov. 2000.
Oracle Scripting—Implementation Guide—Release 11i, Oracle, Aug. 2000.
Oracle eMail Center—Implementation Guide—Release 11i, Oracle, Aug. 2000.
Oracle iSupport—User Guide—Release 11i, Oracle, May 2003.
Computer Telephony, Ric Telecom, vol. 7, No. 7, Jun. 20, 2004, pp. 66-72.

* cited by examiner

DYNAMIC CUSTOMER SATISFACTION ROUTING

CROSS-REFERENCE TO RELATED APPLICATION

The present patent application claims priority to U.S. Provisional Patent Application No. 60/682,180, filed May 17, 2005, and entitled "Dynamic Customer Satisfaction Routing," the entire disclosure of which is incorporated by reference herein.

BACKGROUND

1. Field of the Invention

The present invention relates to customer service systems and call centers, and more particularly, to a system and method for facilitating and routing customer service interactions based on performance indicators.

2. Description of Related Art

Product or service provider interactions with customers are generally accomplished with the aid of a telecommunications system such as a Private Branch Exchange (PBX) or an Automatic Call Distributor (ACD), which can route telephone calls originating from a Public Switched Telephone Network (PSTN) or the Internet, e.g., Voice over IP (VoIP), to an appropriate agent of the provider. For instance, customer phone calls can be switched to an agent, e.g., a customer service representative, based on pre-determined routing rules applied to the caller's phone number and the number they dialed. The number called from is generally referred to as an Automatic Number Identification (ANI) and the number called to is generally referred to as a Dialed Number Identification Service (DNIS). The ANI and DNIS can be extracted from the phone line in order to make a determination of how the call should be routed using a database wherein customer information is matched with the ANI and DNIS to aid in the disposition of the call.

Call routing can be further based on data that indicates the skills possessed by particular agents. By matching the skills of an agent coincident with the telephone calls that are coming in to a PBX or ACD, customer service can be enhanced by routing callers to the best-suited or best-skilled agent. This is in addition to the "default" treatment of routing calls based on the availability of agents. Such a skills orientation is generally referred to as skills-based routing and is described in commonly owned and copending U.S. patent application Ser. No. 09/798,226, filed Mar. 2, 2001, and entitled, "Call Center Administration," the disclosure of which is incorporated herein by reference in its entirety.

In addition to telephone calls, similar routing techniques may be applied to emails sent by customers, as well as Web-based telephone callback requests and Web-initiated chat sessions. These communications, represented by a plurality of media types, can be handled with what's commonly referred to as a multi-channel or multi-media ACD, which is described in commonly owned U.S. Pat. No. 6,697,858, the disclosure of which is incorporated herein by reference in its entirety.

While the means to route phone calls, e-mails, web chats, web callback requests, and other interactions can be handled based on the disciplines of skills-based routing, automatic number identification, and dialed number identification service, aspects dealing with customer satisfaction and agent performance are not taken into consideration. Take, for example, a situation where a customer makes a call to a contact center and has a bad experience with an agent. Perhaps this bad experience is based on a lack of proficiency or skill of the agent or perhaps the bad experience is based on poor treatment of the caller. In conventional systems, there is no immediate recourse for the caller in this situation. If the caller feels especially motivated to take action on poor treatment, he or she might be compelled to hang up the phone and make another phone call to a supervisor to lodge a complaint. Alternatively, the customer might write an e-mail or letter to the appropriate authority to express dissatisfaction. In some cases, there might exist an after-the-fact survey either taken over the phone, via an Interactive Voice Response (IVR) automated system or with a third-party survey company. After-the-fact surveys are also available in written form or can be set up on web sites for customers to use. Nonetheless, conventional customer service systems fail to, among other things, fully factor in previous survey results to the routing of subsequent calls; automatically provision survey instruments before, during, and after a call; and to associate routing and survey linkage/logic to multimedia call center projects.

SUMMARY OF THE INVENTION

The present invention overcomes the deficiencies of the prior art by providing a robust customer service environment employing "Key Performance Indicators" (KPIs), which represent both customer interaction experiences and also the overall efficacy of agent performance on an interaction-by-interaction basis. A KPI can be any metric for measuring a category of information related to a call center interaction, e.g., customer satisfaction or agent ability/performance. Input from customer experiences, whether originating from the customer, agent, or agent supervisor, is catalogued and linked to one or more KPIs.

In an embodiment of the invention, a method of facilitating creation of a key performance indicator template comprises the steps of: defining a performance metric, linking the performance metric to a database or a real time query command, and generating a survey based on the performance metric. The survey can be automatically generated with all requisite linkages to a call center system and may comprise a HTML page, a JSP page, a VXML page, a CGI script, a Chat page, or a combination thereof. The method can further include the steps of: defining a key performance indicator, assigning the performance metric to the key performance indicator, defining a scoring level for the key performance indicator, and associating a weight with the key performance indicator. The key performance indicator is associated with a key performance indicator template, which is linked with a project comprising routing rules, triggers, and specific actions that are driven as a result of the key performance indicator template. The project may be a phone/IVR project, Web CallBack project, email project, or a Chat project. The method may further comprise the step of defining whether the key performance indicator template triggers pre-, during, and/or post-call, -chat, -CallBack, or -email input from a call center user.

In another embodiment of the invention, a method of processing call center user input comprises the steps of: executing a key performance indicator template comprising at least one key performance indicator, and receiving input from a call center user in association with the key performance indicator during a call center interaction with the call center user. The input may comprise spoken or touch-tone input. The method can further comprise the step of routing the call center interaction according to the input. The method may also comprise storing the input to route subsequent call center interactions with the call center user. Furthermore, the input can comprise data received via an email, web-based callback, or a chat interaction. The method can further comprise the step of adjusting at least one skill level of a call center agent based on the input. The key performance indicator may be an indicator of the call center user's satisfaction.

In yet another embodiment of the invention, a method of scoring agent performance in a call center interaction comprises the steps of: executing a key performance indicator template comprising at least one key performance indicator (KPI), facilitating a call center interaction between a call center agent and a call center user, and receiving a score associated with the key performance indicator. The score may reflect the call center agent's performance during the call center interaction. The score may reflect one or more customers' input based on the performance of an agent during a call center interaction and further the score may reflect the opinion of the agent's supervisor of the interaction. The score may further comprise a proficiency level, or skill associated with that agent. The weighting of the KPIs may be directly correlated with the level of proficiency on a skill associated with that agent. In this respect, the skills database associated with agents may be automatically updated based on inputs from both customers and supervisors. The method may further comprise the steps of: storing the score in a database, and routing subsequent call center interactions based on the stored score.

An advantage of the present invention is that it enables automatic or semi-automatic action to be taken on one or more measured metrics, i.e., KPIs, for the subsequent treatment of a particular customer in subsequent phone calls. For example, a caller (or person e-mailing or chatting, etc.) can be routed to either a supervisor or to an agent who is better suited to help that customer based on the input from that customer, the previous agent, or the agent's supervisor, in a survey associated with the caller's prior interaction. Another advantage of the present invention is that it facilitates certain triggers or thresholds of measured KPIs such that a call can be automatically routed during or after the call based on these triggers.

Yet another advantage of the present invention is that it permits the setup of a common scorecard for KPI performance that acts as a template to be applied to different media types. For example, an administrator of an ACD or multimedia ACD is able to setup an association of KPIs, scores, thresholds, triggers, and routing decisions on a case-by-case basis. Such a template ("KPI Template") can be advantageously stored in a common database and automatically linked to the logic flow of call center transactions across different media types such as phone calls, e-mails, chats and web call back requests.

The foregoing, and other features and advantages of the invention, will be apparent from the following, more particular description of the embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE EMBODIMENTS

Figure 1:
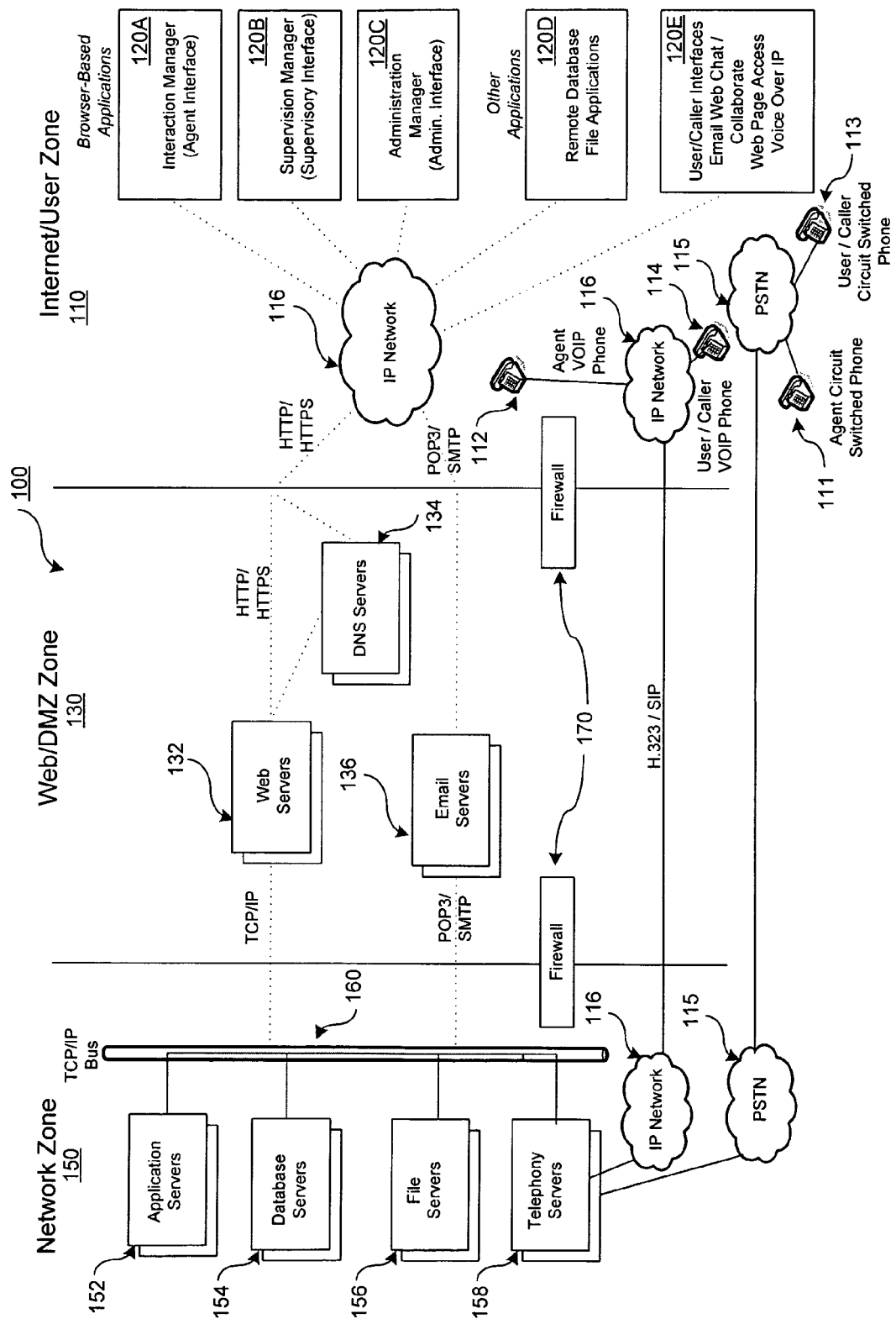
FIG. 1 illustrates a top level view of a dynamic customer satisfaction routing network according to an embodiment of the invention.

Embodiments of the present invention and their advantages may be understood by referring to FIGS. 1-17, wherein like reference numerals refer to like elements, and are described in the context of a robust customer service call center environment employing "Key Performance Indicators" (KPIs), which represent both customer interaction experiences and also the overall efficacy of agent performance on an interaction-by-interaction basis. Nonetheless, the improvements described herein are applicable to any type of environment where interaction, including communications, between multiple parties is facilitated.

FIG. 1 illustrates a top level view of a dynamic customer satisfaction routing network 100 according to an embodiment of the invention. In sum, the network 100 facilitates the manual, automatic, and semi-automatic treatment of interactions with "customers," i.e., callers or users of the system. Although the network 100 is described in the context of callers or users being customers of a particular call center or a party in which the call center is handling calls on its behalf, the callers do not necessarily have to be a customer in the traditional sense, i.e., a buyer of a good or service. Rather, callers or users can be any party who has some need or interest in using the network to interact with the call center agents and/or supervisor(s)/administrator(s). Moreover, callers or users may use a wide variety of communication means, examples of which are described below, to interact with the call center in addition to a traditional telephone. "Interactions" are therefore not limited to telephone calls.

In order to better understand the present invention, the network 100 is described as comprising three separate "zones," which together facilitate a customer interaction. These "zones" may be divided in a variety of ways and the exemplary embodiment shown in no way limits one of ordinary skill in the art from implementing the invention in another configuration. The three zones are referred to as an "Internet/User Zone" 110, a "Web/DMZ Zone" 130, and a "Network Zone" 150.

The Internet/User Zone 110 comprises multiple interfaces 120A-E for call center agents, supervisors, and other authorized parties to access the network 100 and use telephone instruments 111 and 112 via a PSTN or Internet Protocol (IP) network, and/or computers (not shown) to access database-driven information associated with customers, e.g., caller information history. It is not a prerequisite that agents have access to caller information history for the invention to be useful, but it is helpful for agents to have access to such. The Internet/User Zone 110 implements software that allows administrators to create "Key Performance Indicator" (KPI) templates, as described below, which will provide the routing instructions, triggers, and other rules for the dynamic routing of customer interactions. The Internet/User Zone 110 further implements software that allows supervisors or authorized third parties to provide monitoring and scoring of agent transactions in real time as well as the scoring of agent transactions off-line using KPI templates that were created by the aforementioned administrator. The Internet/User Zone 110 further comprises telephone instruments 113 and 114, computers (not shown) and/or other access terminals (not shown), wherein customers are able to access the network 100 in order to interact and/or "self navigate" through information stores, e.g., websites, and questionnaires, i.e., surveys, and also be able to interact with agents and supervisors. Such interactions include, but are not limited to, telephone calls including VoIP calls, Web-initiated chats, email, and web callbacks. Telephone calls can be sent to other parts of the network 100 over, for example, a PSTN 115; a cellular network (not shown); a computer network 116 such as an IP network, the Internet, or a private computer network; the implementation of or connection to which are apparent to one of ordinary skill in the art. Computer-based interactions may be facilitated via protocols such as, but not limited to HyperText Transport Protocol (HTTP), Secure HyperText Transport Protocol (HTTPs), as well as Post Office Protocol 3 (POP3) and Simple Mail Transport Protocol (SMTP) for email communications, the implementation of which are also apparent to one of ordinary skill in the art.

Exemplary interfaces 120A-E include an Interaction Manager 120A, a Supervision Manager 120B, and an Administration Manager 120C. The Interaction Manager 120A, the Supervisor Manager 120B, and the Administration Manager 120C provide interfaces for the agent, a supervisor or the like, and an administrator, respectively, to interact with the network 100. In one embodiment of the invention, the interfaces 120A-C are browser-based applications. Interfaces 120D and 120E are further included to facilitate communication with respective database servers and user/callers opting to contact the call center via email, web chat, VoIP, web page forms, or other communication techniques facilitated through the IP network 116.

In an embodiment of the invention, the Web/DMZ Zone 130 comprises any combination of Web Servers 132, Domain Name Servers 134, and Email Servers 136 and other components to provide secure access and transport services for computer-based interactions such as Web-initiated chat requests, Web-initiated Call-back requests between customers and agents, between customers and supervisors, and between supervisors and agents. The Web/DMZ Zone 130 also provides a transport layer for administration, agent and supervisor screens such that agents, supervisors and administrators have secure access to databases containing customer information, contact center configuration, routing rules, KPI templates and real-time information for the handling of interactions (real time and non-real time interactions). In at least one embodiment of the invention, the Web Servers 132 interact with a customer's computer, an agent's computer, a supervisor's computer, an administrator's computer, or a combination thereof, and associated software over HTTP or HTTPs as particularly shown in FIG. 7, which is described below. The Web Servers 132 may optionally store and transfer messages that are passed to and from the Network Zone 150, where the messaging between those elements is implemented by Transport Control Protocol/Internet Protocol (TCP/IP). Therefore, the Web Servers 132 in the Web/DMZ Zone 130 also act as translators between HTTP or HTTPS and TCP/IP. This translation capability is in place to provide easy and universal access to the interfaces 120A-E or other thin client applications in use by the agents, supervisors, administrators, and/or customers.

In an embodiment of the invention, the Network Zone 150 comprises one or more application servers 152, one or more database servers 154, one or more file servers 156, and one or more telephony servers 158. These software-based servers are located in host computers connected to a TCP/IP bus 160, which is in turn connected to the email servers 136 and web servers 132 in the Web/DMZ zone 130.

Application servers 152 implement software that controls the flow of phone calls, e-mails, chats, and web call-back requests between customers and agents, and supervisors. The database servers 154 store information such as, but not limited to customer records, interaction history, application parameters, agent location data, agent skill data and most notably, information which links KPI(s) and customer satisfaction data to the treatment and priority of customer interactions. The file servers 156 in the network zone 150 are used to store media such as agent recordings, KPI templates, scripts, voice messages, chat transcripts and e-mail transcripts. The telephony servers 158, the implementation of which is apparent to one of ordinary skill in the art, offer control over the physical switching of phone calls whether they are "soft switch" phone calls used with Voice Over IP gateways or PSTN-switched phone calls over switching cards housed in personal computers (PCs). For example, a telephony server 158 may facilitate Internet telephony implementing a signaling protocol, such as a Session Initiated Protocol (SIP), to establish, for example, an audio/videoconferencing session over the IP network 116. Alternatively, sessions facilitated by a telephony server 158 may implement H.323, which is a standard approved by the International Telecommunication Union (ITU) that defines how audiovisual conferencing data is transmitted across networks. H.323 enables users to participate in the same conference even though they are using different videoconferencing applications.

The network 100 may also include one or more optional firewalls 170, the implementation of which is apparent to one of ordinary skill in the art, to prevent unauthorized access between the Internet/User zone 110 and Web/DMZ zone 130, as well as between the Web/DMZ zone 130 and the Network zone 150.

Figure 2:
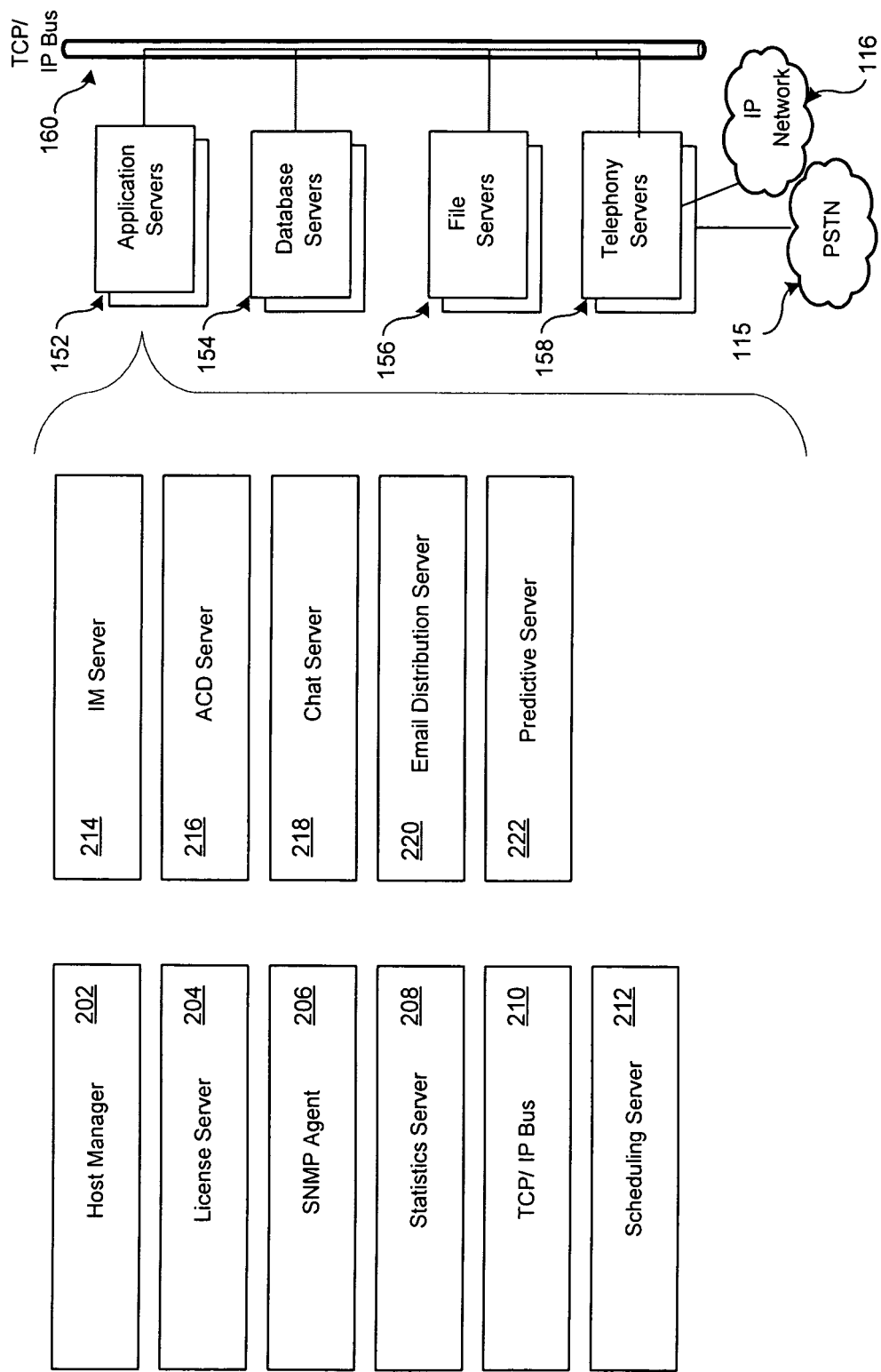
FIG. 2 illustrates application servers within a network zone of the network shown in FIG. 1.

FIG. 2 illustrates exemplary applications of an application server 152 within the network zone 150 of the network 100 according to an embodiment of the invention. For instance, the application server 152 comprises a host manager 202, a license server 204, a SNMP agent 206, a statistics server 208, a TCP/IP bus 210, a scheduling server 212, an IM server 214, an ACD server 216, a chat server 218, an email distribution server 220, and a predictive server 222. Commonly-owned U.S. patent application Ser. No. 09/902,069, entitled "Call Center Administration Manager with Rules-Based Routing Prioritization," the entire disclosure of which is incorporated by reference herein, describes these applications in greater detail. Such a combination of applications is exemplary only and does not preclude any other configuration based on, for example, any subset of these components.

Although not the primary focus of the invention, each application in FIG. 2 is briefly described to better understand it role in the overall network 100. Particularly, the host manager 202 provides a mechanism for file transfer protocol (FTP) to other application servers and as a proxy to a network manager and manages communications with client machines (e.g., of the customers and/or agents and supervisors) interacting with the server 152. For example, the host manager 202 manages FTP sessions with the server 152. The license server 204 facilitates registration of the client machines and governs legal use of licenses. The simple network management protocol (SNMP) 206 agent manages SNMP-compliant devices within the network 100 by sending messages, called protocol data units (PDUs), to the SNMP-compliant devices, which store data about themselves and return this data to the SNMP requesters. The statistics server 208 transmits statistics interaction histories to and from the databases 154. The TCP/IP bus 210 facilitates the transmission of data over a TCP/IP network. The scheduling server 212 schedules certain events such as, but not limited to call menus for after business hours. The IM server 214 is an application that acts as a bridge between the Network zone 150 and the client applications. The automatic call distributor (ACD) server 216 stores agent skill information. In an embodiment of the invention, the handling instructions are based on one or more key performance templates as described below. The chat server 218 facilitates chat sessions with customers over, for example, the Internet. The email distribution server 220 facilitates and manages email communications among customers, agents, and supervisors. The predictive server 222 manages and assists automatic outbound call dialing for agents and/or supervisors.

Figure 3:
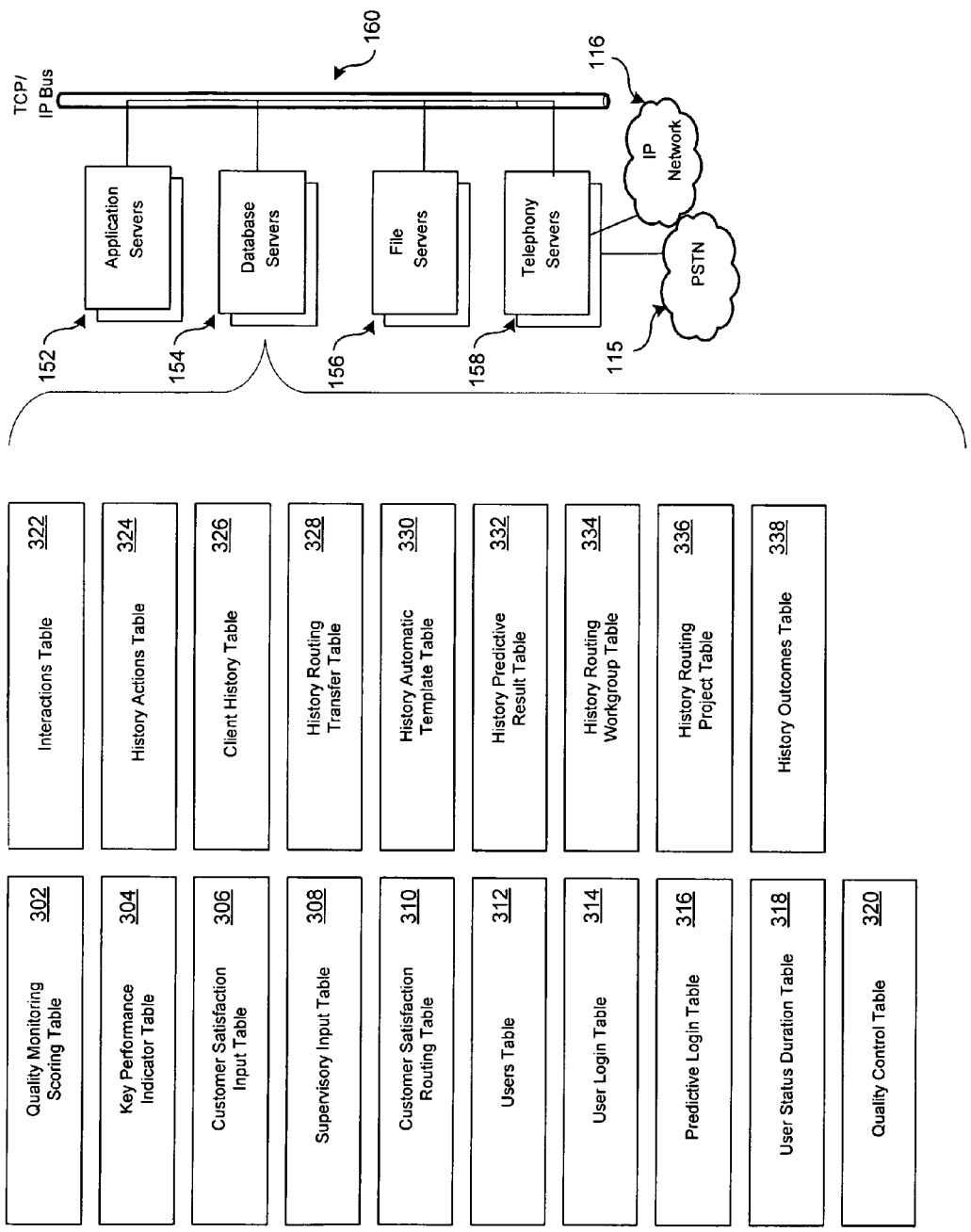
FIG. 3 illustrates database servers within a network zone of the network shown in FIG. 1.

FIG. 3 illustrates exemplary tables configured within the database server 154 according to an embodiment of the invention. These exemplary tables include, but are not limited to a quality monitoring table 302, a key performance indicator table 306, a supervisory input table 308, and a customer satisfaction routing table 310. These tables 302-310 store information to facilitate the KPIs, KPI templates, and dynamic routing of customer interactions with the network 100 discussed herein.

The database server 154 further includes a users table 312, a user login table 314, a predictive login table 316, a user status duration table 318, a quality control table 320, an interactions table 322, a history actions table 324, a client history table 326, a history routing transfer table 328, a history automatic template table 330, a history predictive result table 332, a history routing workgroup table 334, a history routing project table 336, and a history outcomes table 338, the implementation of all of which are apparent to one of ordinary skill in the art. Such a configuration of tables is exemplary only and does not preclude any other configuration based on, for example, any subset of these components.

In general, tables 302-328 store three different types of data: (1) information about the workforce, for example, agent skills and profiles, designated workgroups, and identification of supervisors; (2) business rules, for example, routing of customer inquiries and timing of events; and (3) historical information.

Figure 4:
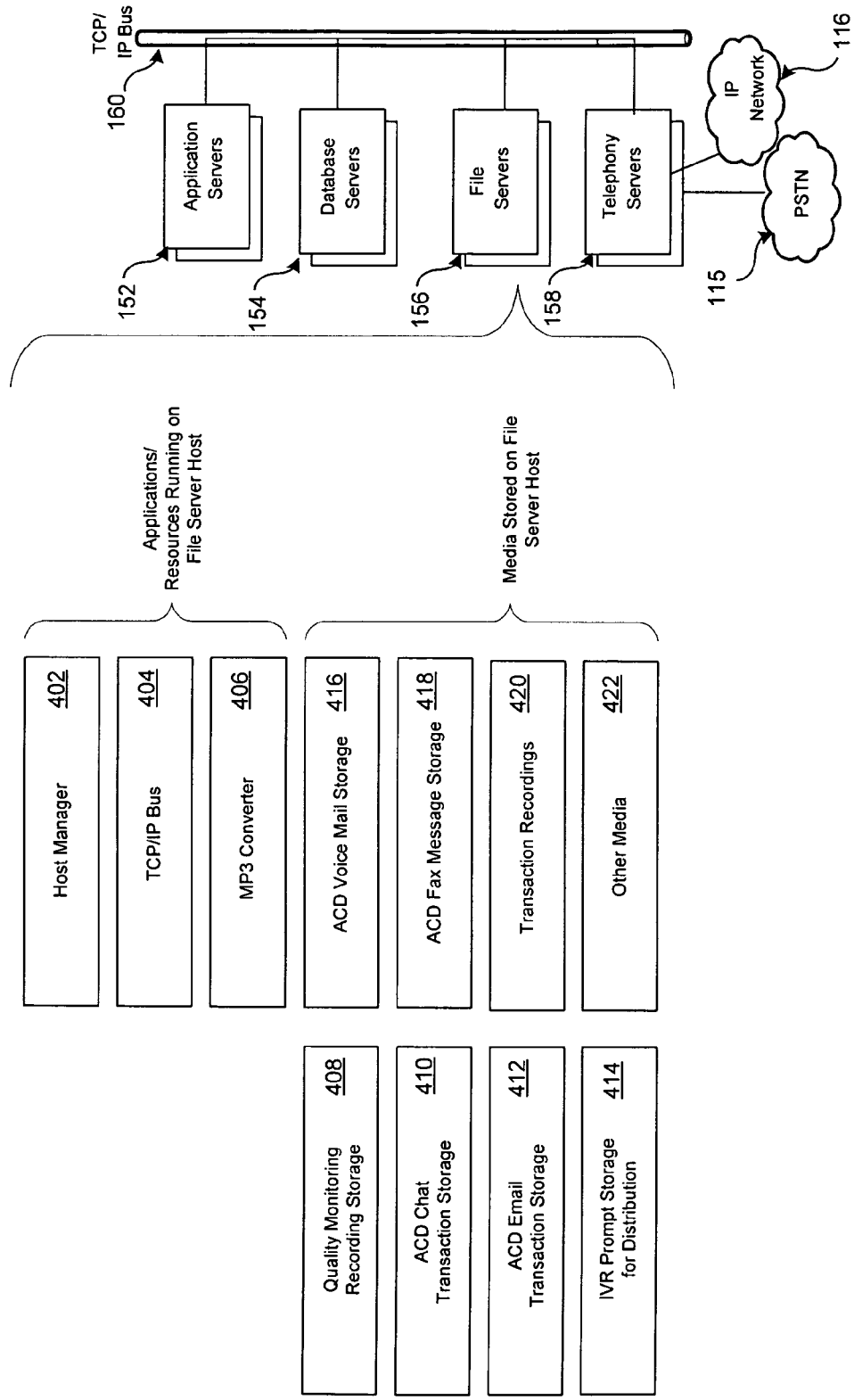
FIG. 4 illustrates file servers within a network zone of the network shown in FIG. 1.

FIG. 4 illustrates exemplary components of a file server 156 within the network zone 150 of the network 100 according to an embodiment of the invention. In general, the components can be differentiated between applications and resources running on the file server 156, and media stored on the file server 156. For instance, in an embodiment of the invention, the file server 156 includes applications: host manager 402, TCP/IP bus 404, and a MPEG audio layer-3 (MP3) converter 406, the implementation of all of which are apparent to one of ordinary skill in the art. The MP3 converter 406 is provided for storing audio into a relatively small and manageable digital file sizes. Nonetheless, alternative audio encoding schemes to MP3 may be implemented.

The file server 156 further comprises storage for different types of media. Particularly, the file server 156 comprises a quality monitoring recording storage 408, an ACD chat transaction storage 410, an ACD email transaction storage 412, an IVR prompt storage 414, an ACD voice mail storage 416, an ACD fax message storage 418, a transaction recordings storage 420, and other media storage 422.

Figure 5:
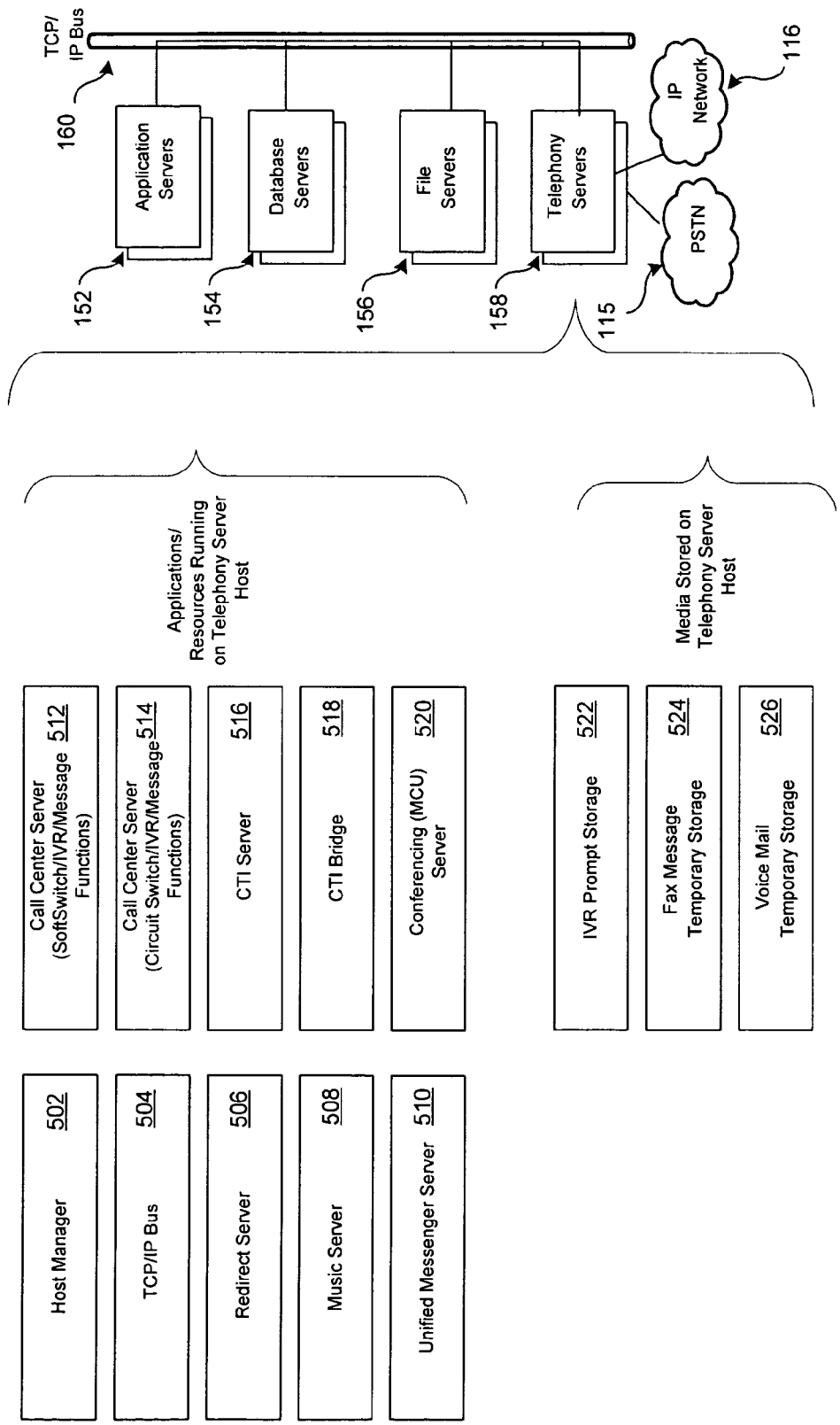
FIG. 5 illustrates an application view of telephony servers within a network zone of the network shown in FIG. 1.

FIG. 5 illustrates an application view of telephony servers 158 within the network zone 150 of the network 100 according to an embodiment of the invention. Particularly, a plurality of applications/resources running on a telephony server 158 include, but are not limited to: host manager 502, a TCP/IP bus 504, a redirect server 506, a music server 508, a unified message server 510, a call center server 512, a call center server 514, a (CTI) server 516 used of outbound call set-up and load balancing; and CTI bridge 518, used for handling communications between PC-based network and voice processing cards; and a conferencing (MCU) server 520. The call center server 512 serves as a softswitch handling IVR call switching and message functions over the IP network 116. The call center server 514 serves as a circuit switch handling IVR and message functions over the PSTN 115. The telephony servers 158 comprise storage for various media; such storage including, but not limited to IVR prompt storage 522, fax message temporary storage 524, and voice mail storage 526.

Figure 6:
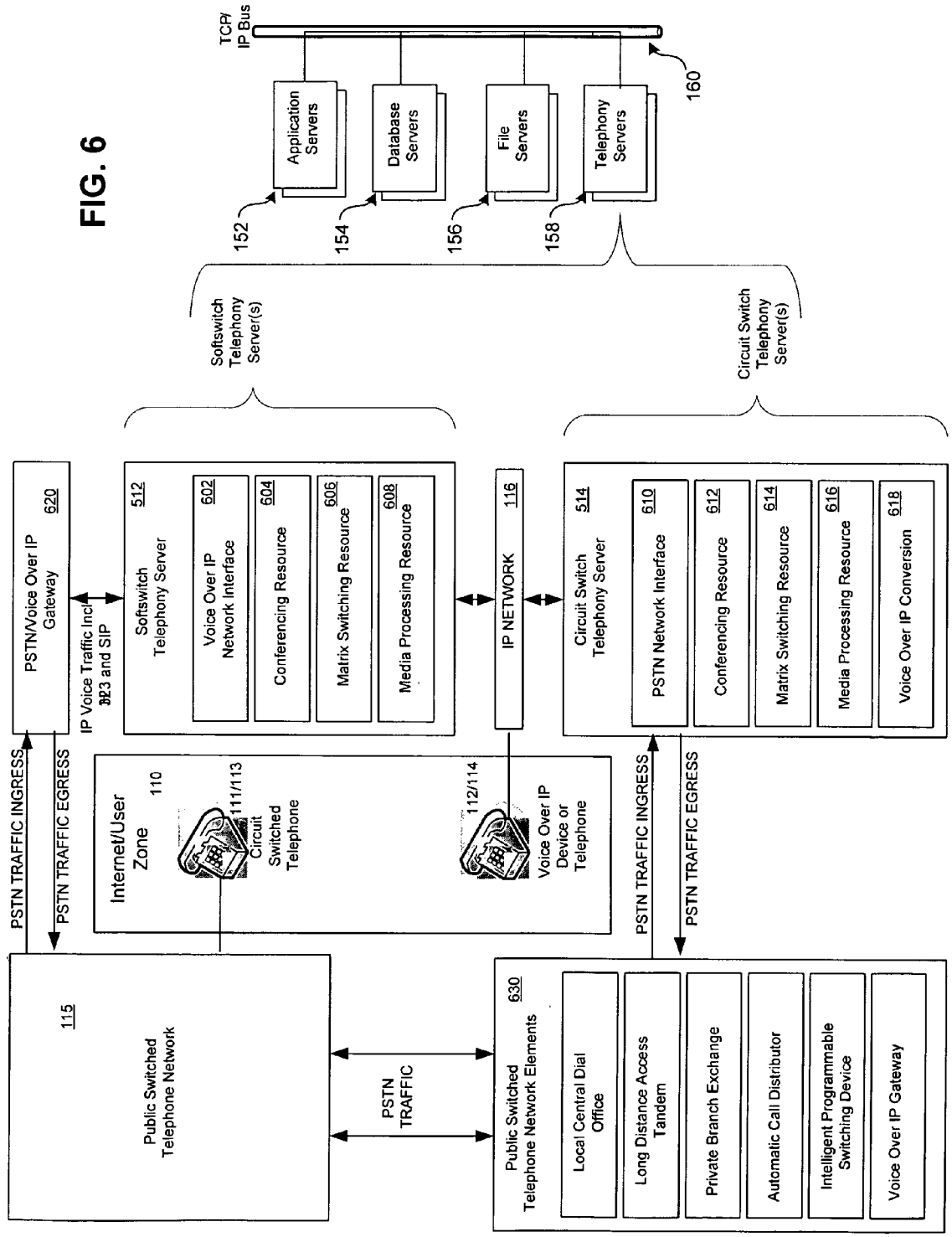
FIG. 6 illustrates a switching view of telephony servers within a network zone of the network shown in FIG. 1.

FIG. 6 illustrates a switching view of telephony servers 158 within a network zone 150 of the network 100 according to an embodiment of the invention. Particularly, the softswitch telephony server 512 comprises a VoIP network interface 602 and conferencing, matrix switching, and media processing resources 604, 606, and 608, respectively. The circuit switch telephony server 514 comprises a PSTN network interface 610 and conferencing server 520, matrix switching, media processing resources 612, 614, and 616, respectively as well as VoIP conversion software 618. As illustrated, the softswitch 512 communicates with the PSTN 115, and hence circuit switched telephones 111 and/or 113, through a PSTN/VoIP gateway 620. The circuit switch 514 communicates with the PSTN 115, and hence circuit switched telephones 111 and/or 113, through PSTN elements 630, as well as a VoIP device 114 or 116 via the IP network 116. The softswitch 512 and circuit switch 514 are in communication with one another as well via the IP network 116.

Figure 7:
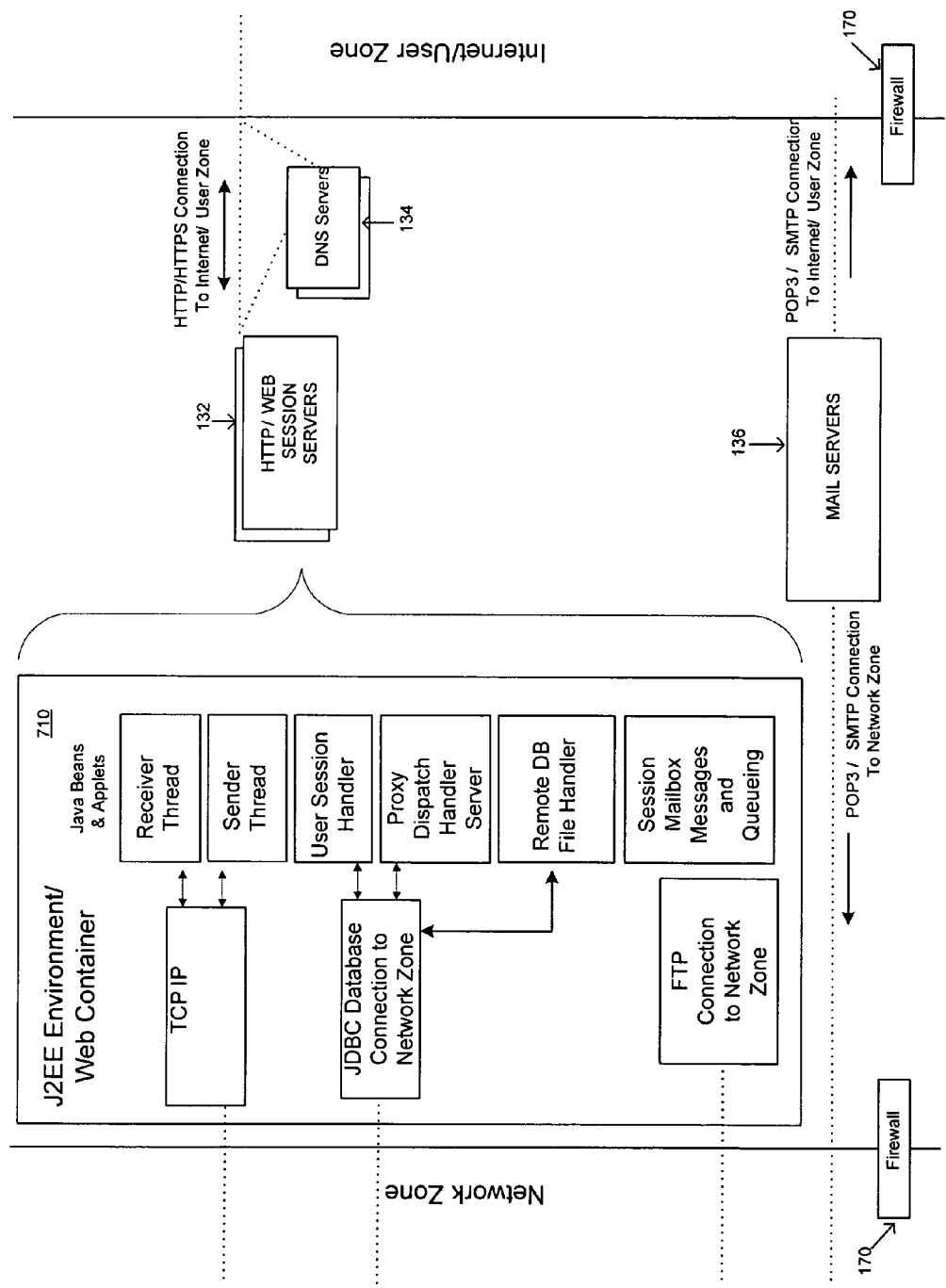
FIG. 7 illustrates a Web/DMZ zone of the network shown in FIG. 1.

FIG. 7 illustrates a detail view of the Web/DMZ zone 130 of the network 100 according to an embodiment of the invention. Here, the HTTP/Web servers 132 comprise a standard Java 2 Platform, Enterprise Edition (J2EE)/Web container 710, the implementation of which is apparent to one of ordinary skill in the art.

As previously noted, the present invention facilitates the creation of key performance indicators (KPI) and KPI templates in a database 154 and also the designation of linkage between these templates and specific projects dealing with different media type handling. Input from customer experiences, whether originating from the customer, agent, or agent supervisor, is catalogued and linked to one or more KPIs. One or more KPIs therefore gauge customer interaction experiences and/or the overall efficacy of agent performance, for example, on an interaction-by-interaction basis. KPI templates, as described below, provide the routing instructions, triggers, and other rules for the dynamic routing of customer interactions and the collection of customer satisfaction or agent ability/performance input data.

Figure 8:
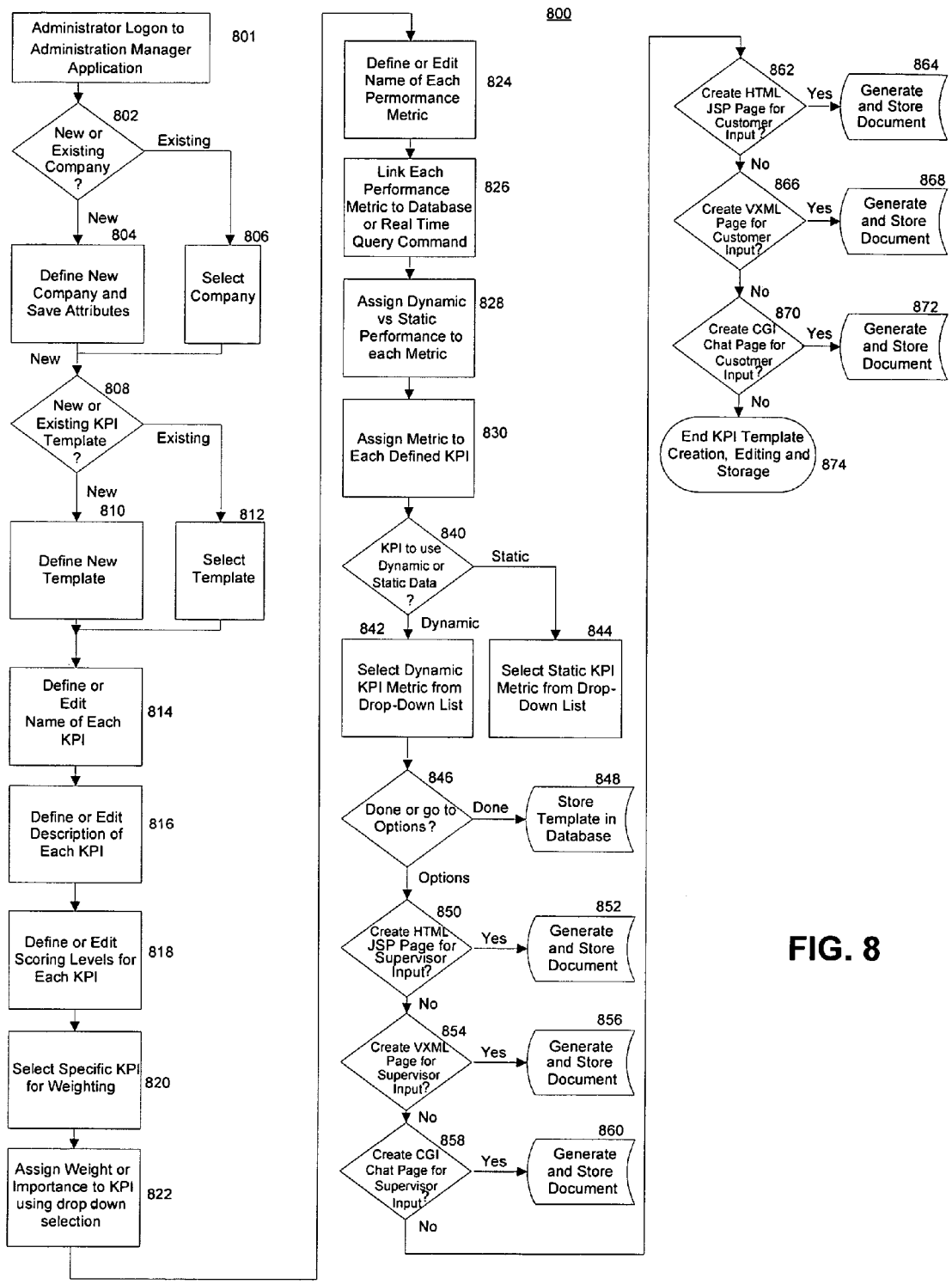
FIG. 8 illustrates a process of creating a Key Performance Indicator (KPI) template according to an embodiment of the invention.
Figure 9:
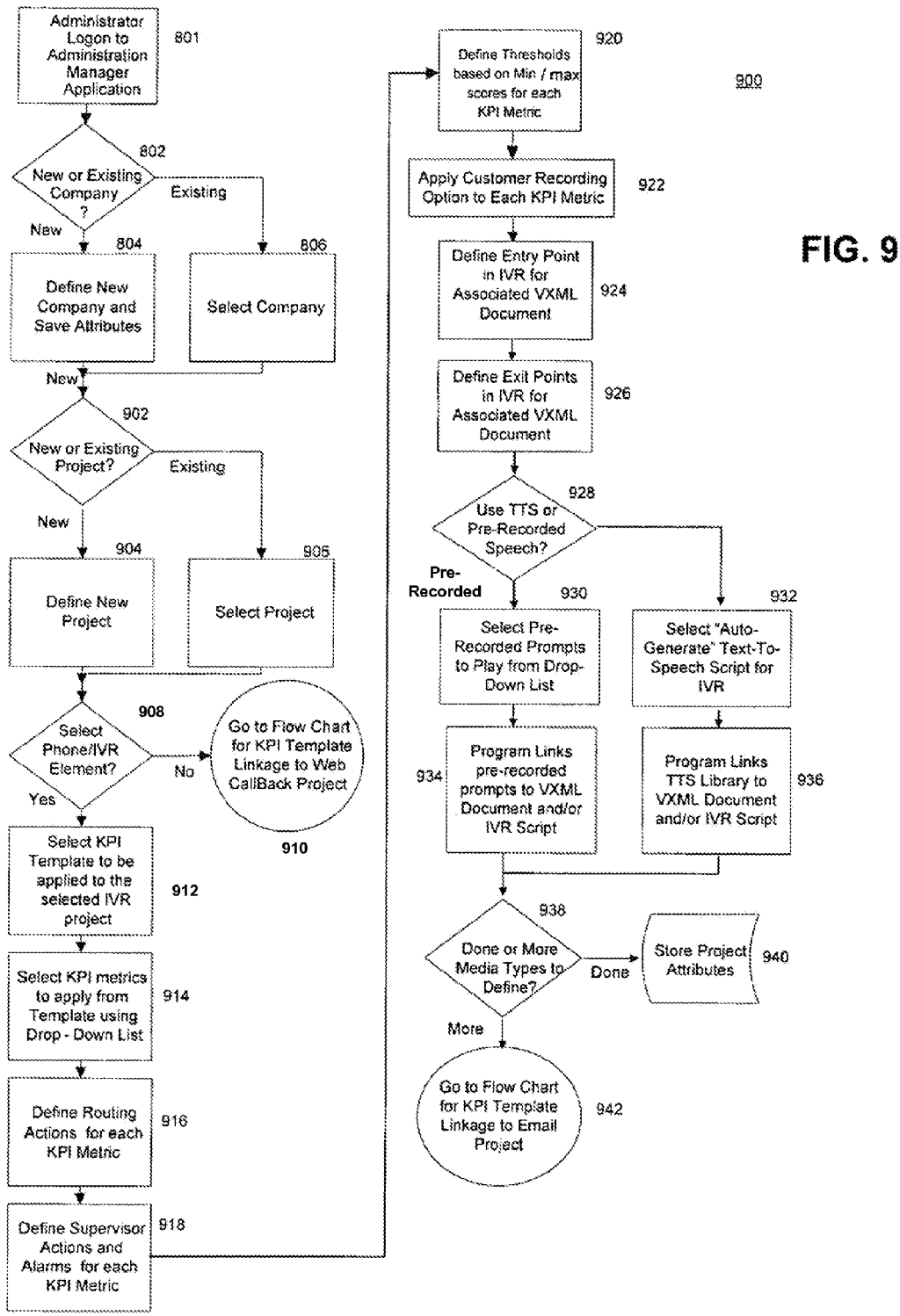
FIG. 9 illustrates a process of linking KPI templates to phone/IVR projects according to an embodiment of the invention.

FIG. 8 illustrates a process 800 of creating a Key Performance Indicator (KPI) template according to an embodiment of the invention. An administrator employs an Administration Manager interface, such as that described in U.S. patent application Ser. No. 09/798,226, entitled "Call Center Administrator Manager," the disclosure of which is incorporated herein by reference in its entirety, to define KPI templates. These KPI templates are then stored in the database 154 and are used to automatically generate user interface views which will be used by both Supervisors and Customers. Such KPI templates provide the means to create, define and store the name and definition of each KPI. Again, a KPI can be any metric for measuring call center information, e.g., customer satisfaction or agent ability/performance, such as, but not limited to, skill level, knowledge, and language proficiency. Further, each template is used to define scoring levels for each defined KPI. Moreover, each template is used to define a weighting mechanism (importance level) for each KPI. In addition, each template is used to link specific performance for each KPI to specific triggers, such as routing triggers or triggers for supervisor intervention. Each template is created to be used as a static template, which can be used to create a "scoring questionnaire" for supervisors to use in scoring the efficacy of certain agents. For example, a trigger can alert a supervisor to perform a survey of the agent-customer interaction during a call. Or the template can be created to be used as the basis for a real-time interaction in the form of a questionnaire a customer fills out. Further, in creating a template the administrator may instruct the system to generate and save scripts associated with the template that may be saved as JSP, CGI, VXML, etc. so as to be able to automatically generate documents or logic flows consistent with the target media type for the anticipated interactions with customers.

The process 800 of creating a KPI template begins by the administrator logging on (step 801) to the administration manager application. The software asks (step 802) to specify a new or existing company for which the template is to be associated with. If the company is a new company, the administrator defines (step 804) the new company's attributes. If an existing company, the administrator selects (step 806) the company from a list of companies having information previously stored. The administrator is then asked (step 808) whether a new KPI template is being generated or an existing KPI template is being edited. If new, the administrator defines (step 810) the new template. If already existing, the administrator selects (step 812) the template she wishes to modify.

Each KPI template includes a number of KPIs. For each KPI, the administrator may define or edit the name (step 814), description (step 816), and the scoring levels (step 818). The administrator may then select (step 820) a specific KPI for weighting and assign (step 822) a weight to that KPI. The administrator then defines or edits (step 824) a name for each performance metric and links (step 826) each performance metric to a database or real time query command. For each metric, dynamic or static performance is assigned (step 828) and the metric is assigned (step 830) to each defined KPI. The administrator is then asked (step 840) whether to use static or dynamic data for the respective KPI. If dynamic, the administrator selects (step 842) a dynamic KPI metric. If static, the administrator selects (step 844) a static KPI metric. The administrator is then asked (step 846) whether she is done or to go to further options. If done, then the template is stored (step 848) in a database.

If the KPI template requires supervisor input, the administrator has the option to create a HTML/JSP page (step 850), a VXML page (step 854), or a CGI page (step 858), thereby resulting in the generation and storage of the appropriate page (steps 852, 856, and 860, respectively. Likewise for customer input, the administrator has the option to create a HTML/JSP page (step 862), a VXML page (step 866), or a CGI page (step 870), thereby resulting in the generation and storage of the appropriate page (steps 864, 868, and 872, respectively. The process 800 then ends (step 874) after creation or editing, and storage of the appropriate page.

Figure 10:
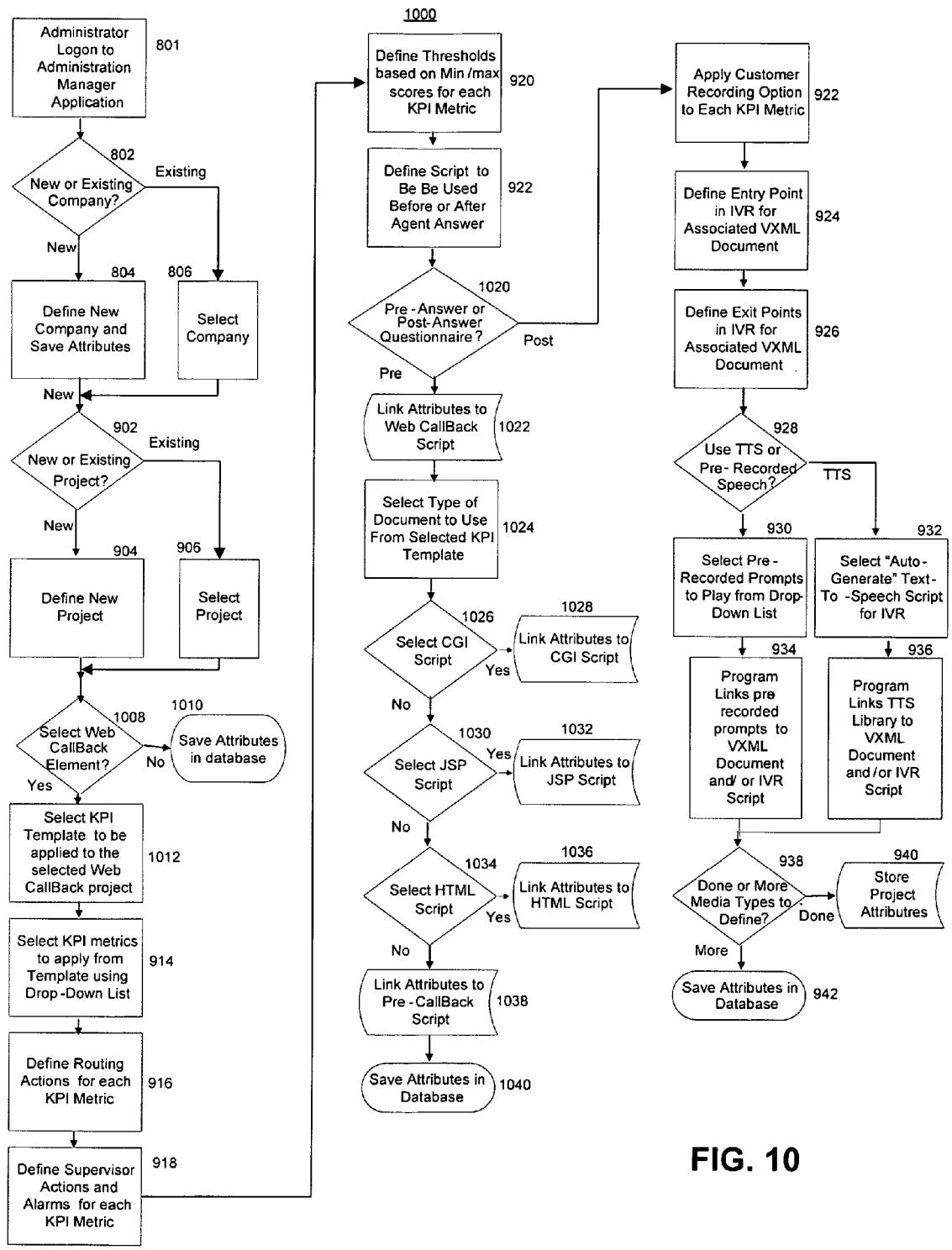
FIG. 10 illustrates a process of linking KPI templates to Web CallBack projects according to an embodiment of the invention.
Figure 11:
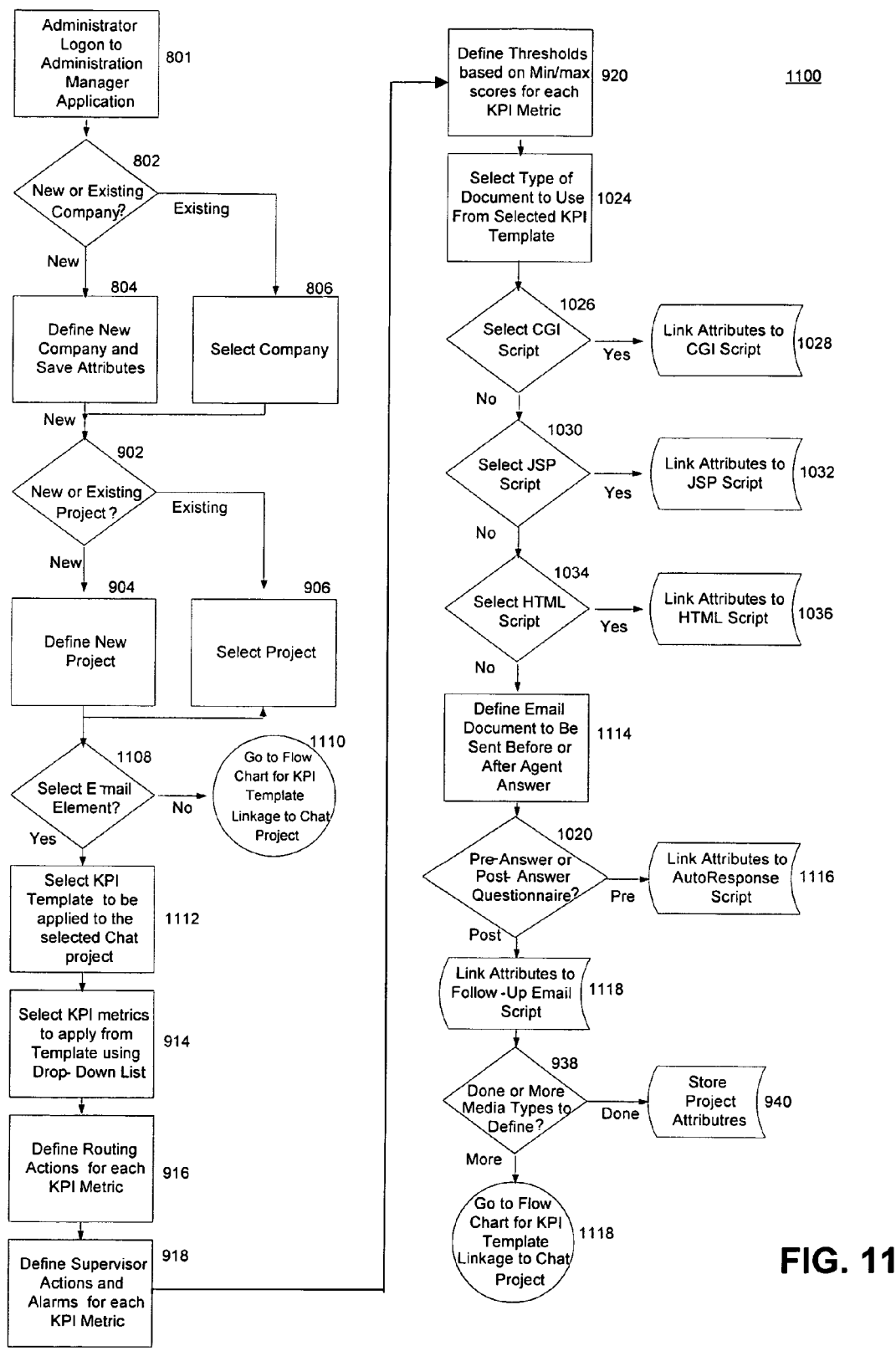
FIG. 11 illustrates a process of linking KPI templates to email projects according to an embodiment of the invention.
Figure 12:
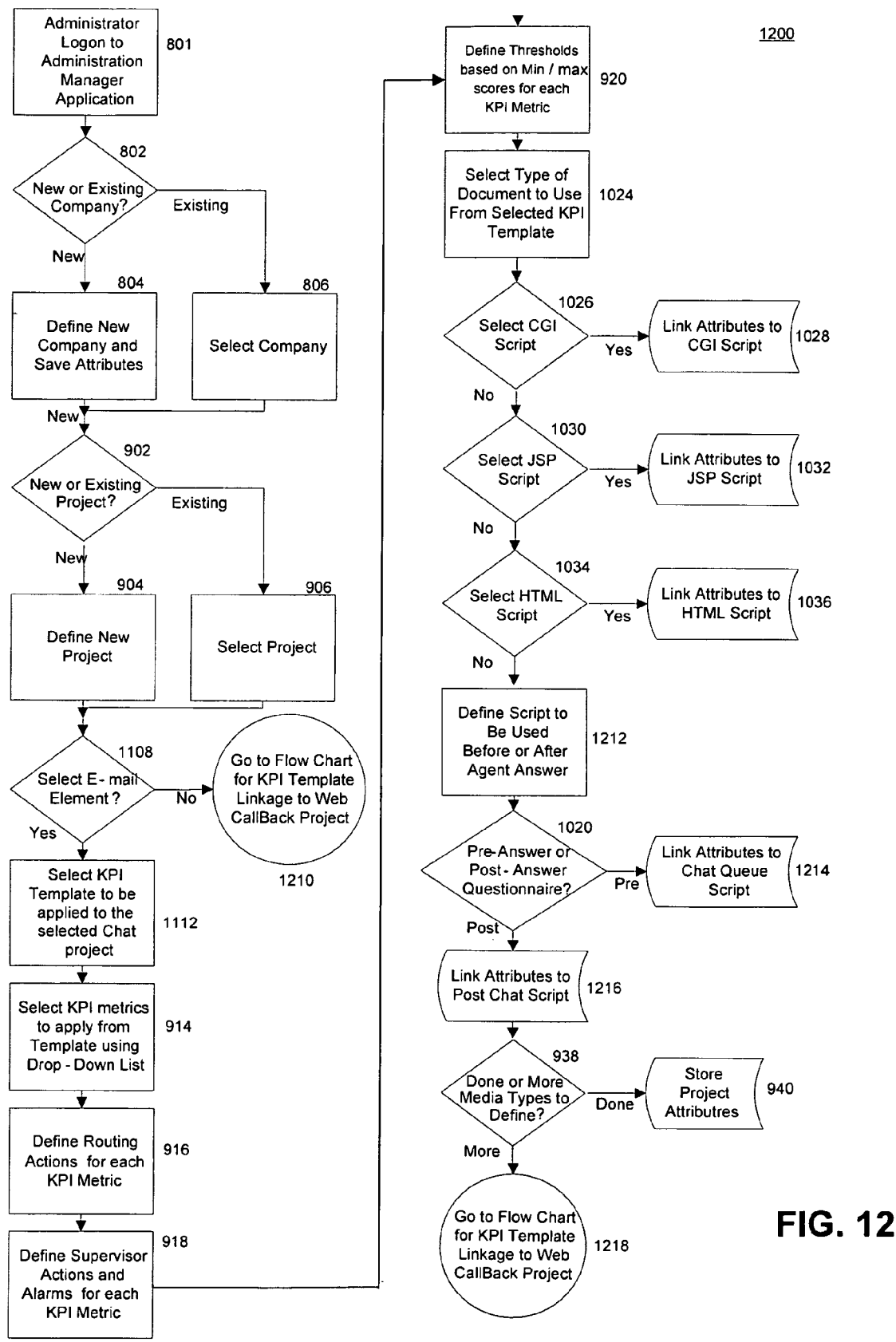
FIG. 12 illustrates a process of linking KPI templates to chat projects according to an embodiment of the invention.

FIGS. 9-12 illustrate processes for linking KPI templates to specific media and/or project types according to at least one embodiment of the invention. For example, in FIG. 9, the administrator associates a KPI template with a phone call logic flow and further defines whether the template should be made to trigger pre-, during, or post-call input from the customer. In the example of FIG. 10, the administrator associates a template with a Web-based chat project and further defines whether the template should be made to trigger pre-, during, or post-chat input from the customer. In the example of FIG. 11, the administrator associates a template with a Web-based CallBack project and further defines whether the template should be made to trigger pre-, during, or post-CallBack input from the customer. In the example of FIG. 12, the administrator associates a template with an ACD email project and further defines whether the template should be made to trigger pre-, during, or post-e-mail input from the customer. The details of these examples are described as follows.

Referring again to FIG. 9, a process 900 for associating a KPI template with phone call logic project starts after the administrator logs into the administration manager application and specifies or defines a particular company. The administrator is asked (step 902) whether this is a new or existing project. If new, the administrator defines (step 904) the new project. If it is an existing project, the administrator selects (step 906) the project from a list of previously stored projects. The administrator is then asked (step 1108) whether to select a phone/IVR element. If no, the process goes (1210) to another process for associating the KPI template to a different type of project, e.g., Web-based chat. If yes, the administrator selects (1112) the particular KPI template to be applied to the selected IVR project. The administrator then selects (step 914) KPI metrics to apply from the template. The administrator then defines (step 916) routing actions for each KPI metric selected. Supervisor actions and alarms are defined (step 918) for each KPI metric. Thresholds are defined (step 920) based on minimum and maximum scores for each KPI metric. The administrator then has the option of applying (step 922) a customer recording to each KPI metric. Entry points in IVR are defined (step 924) for the associated VXML document. Exit points in IVR are defined (step 926) as well.

The administrator is then given the option of specifying (step 928) text-to-speech (TTS) or pre-recorded speech for the customer interface, or both. If pre-recorded speech is desired, the administrator may select (step 930) various pre-record prompts, which are linked (step 934) to the VXML document and/or IVR script. If TTS is desired, the administrator may select (step 932) various TTS scripts, which are then linked (step 936) to the VXML document and/or IVR script. The administrator is then queried (step 938) whether the linkage is completed and if so, the program stores (step 940) the project attributes. If not, the administrator may then proceed (step 942) to another linkage process.

Referring to FIG. 10, a process 1000 for associating a KPI template with a Web-based chat project is illustrated according to an embodiment of the invention. The administrator is asked (step 1008) whether to select a Web CallBack element. If no, the process goes (step 1010) to another process for associating the KPI template to a different type of project. If yes, the administrator selects (step 1012) the particular KPI template to be applied to the selected Web CallBack project. After performing a number of the steps in process 900, the administrator is then queried (step 1020) whether to include a pre-answer or post-answer questionnaire. If a post-answer questionnaire is desired, steps 922-942 are performed as in process 900. If the administrator desires a pre-answer questionnaire, the attributes of the project are linked (step 1022) to a Web CallBack script.

FIG. 11 illustrates a process 1100 for associating a KPI template with an Email project according to an embodiment of the invention. The administrator is asked (step 1108) whether to select an Email element. If no, the process goes (step 1110) to another process for associating the KPI template to a different type of project. If yes, the administrator selects (step 1112) the particular KPI template to be applied to the selected Email project. After performing a number of the steps in process 900, the administrator is then can select (step 1024) the type of document (CGI, JSP, HTML) to use from the selected KPI template. If the CGI Script is selected (step 1026), the attributes are linked (step 1028) to the CGI script. If the JSP Script is selected (step 1030), the attributes are linked (step 1032) to the JSP script. If the HTML Script is selected (step 1034), the attributes are linked (step 1036) to the HTML script. Thereafter the administrator can define (step 1114) the Email document to be sent before or after the Agent Answer. The administrator is then queried (step 1020) whether to include a pre-answer or post-answer questionnaire. If a pre-answer questionnaire is included, then the attributes are linked (step 1116) to an Auto-response script. If a post-answer questionnaire is desired, then the attributes are linked (step 1118) to a follow-up email script and steps 938-940 are performed as in process 900. If more media types require defining, the next operation proceeds (step 1120) to a process for associating a KPI template with a Chat project.

In FIG. 12, a process 1200 for associating a KPI template with a Chat project is illustrated according to an embodiment of the invention. After preliminary administrative steps are performed as explained above, the administrator is asked (step 1108) whether to select an Email element. If no, the process goes (step 1210) to the process 1100 for associating the KPI template to a Web Callback Project. If yes, the administrator selects (step 1112) the particular KPI template to be applied to the selected Chat project. After performing a number of the steps in process 900, the administrator can then select (step 1024) the type of document (CGI, JSP, HTML) to use from the selected KPI template, thereby linking the attributes to a respective CGI script, JSP script, or HTML script by steps 1026-1036. Thereafter the administrator can define (step 1212) the script to be used before or after the Agent Answer. The administrator is then queried (step 1020) whether to include a pre-answer or post-answer questionnaire. If a pre-answer questionnaire is included, then the attributes are linked (step 1214) to a Chat queue script. If a post-answer questionnaire is desired, then the attributes are linked (step 1216) to a follow-up email script and steps 938-940 are performed as in process 900. If more media types require defining, the next operation proceeds (step 1218) to the process 1110 for KPI Template Linkage to Web CallBack Project.

Supervisors or third parties (e.g., a compliance officer) can score agent performance and/or customer interaction based on the templates noted above. Such scoring will store values in the database which will have an effect on subsequent routing decisions in phone calls, e-mails, chats, and web callbacks for example, but are not limited to these types of interactions. In an embodiment of the invention, the Supervisor uses the Supervision Manager to select specific interactions based on a plurality of search criteria including company, customer, agent and specific interaction. Further, the Supervisor would be able to select a specific interaction based on the stored template mentioned above, and answer questions dealing with scoring and weighting the KPIs in question for that agent.

Figure 13:
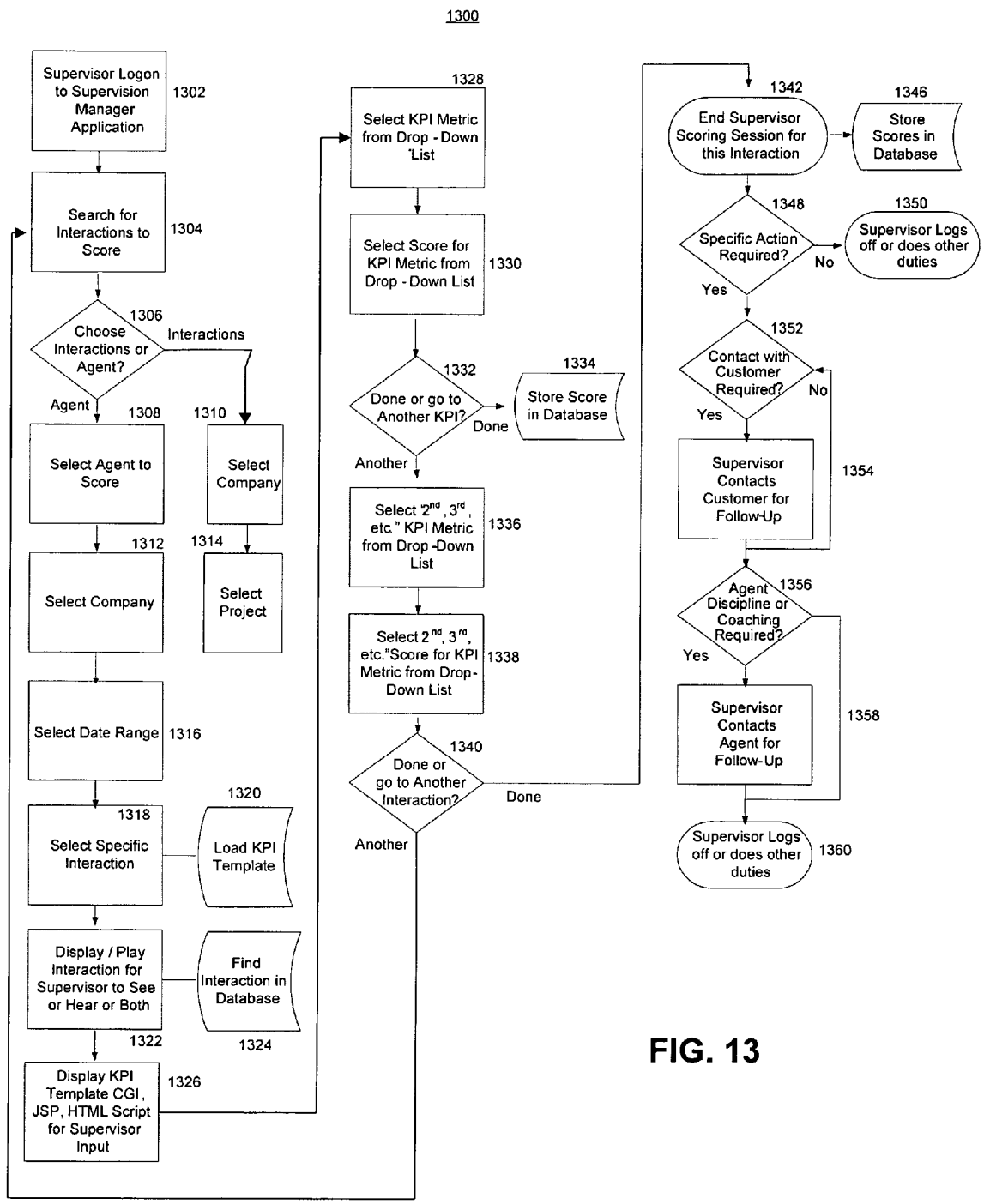
FIG. 13 illustrates a process of scoring agent KPI by a supervisor according to an embodiment of the invention.

FIG. 13 illustrates a process 1300 for scoring a KPI agent or interaction by a supervisor according to an embodiment of the invention. After the Supervisor logins (step 1302) to a Supervision Manager Application, the supervisor can search (step 1304) for an interaction to score. The supervisor is then queried (step 1306) to choose an interaction or agent to score. If an interaction is selected, the supervisor chooses the appropriate Company (step 1310) and Project (step 1314). If an agent is selected, the supervisor chooses the appropriate Agent to score (step 1308) and Company (step 1312). The scoring process then proceeds to the selection of a date range (step 1316) and specific interaction (step 1318). At the specific interaction step, a KPI template is loaded (step 1320). Once a specification is selected, the supervisor can display or play the visual or audio interaction (step 1322) where the interaction is located in a database (step 1324).

Once the specific interaction is selected, a KPI Template as well as one or more of the CGI, JSP, and HTML scripts are displayed for Supervisor input (step 1326). Next, a KPI Metric (step 1328) and Score for KPI Metric (step 1330) are available from a drop down list for the supervisor to select. The supervisor is then queried (step 1332) to score additional KPI metrics (step 1336) and KPI scores (step 1338) or complete the scoring (step 1334). Next, the supervisor is queried (step 1340) to complete the interaction step and proceed to end the session (step 1342) or proceed with another interaction where the process is again repeated starting at step 1304.

When the supervisor completes the scoring session, the scores are stored in a database (step 1346) and the supervisor is then queried on whether a specific action is required (step 1348). If no other action is required, the supervisor proceeds to log off or does other duties (step 1350). If an action is required, the supervisor is queried (step 1352) to choose if contact with the customer is required or not. If so, the supervisor is prompted to contact customer for follow-up (step 1354). This step (step 1354) is bypassed if the supervisor chooses that contact with the customer is not required. After the follow-up decision has been made, the supervisor is queried on whether or not an agent discipline or coaching is required (step 1356). If so, the supervisor contacts the agent for follow-up (step 1358). The process ends (1360) where the supervisor logs off or does other duties or if no agent discipline or coaching is required. The scoring session scores that are stored in the database (step 1346) can be used to automatically update the agent's skills and skill proficiency in the database. Such automatic updating of an agent's skills via the scoring session offer an alternative to manual entry of skill updates by the administrators or supervisor. Such input may be further used to dynamically route the interaction so the customer can get customized treatment during that interaction—or the data may be stored and used as a means to route and treat subsequent interactions—or that data may be used to act both on the current interaction and also subsequent interactions. Such customer-solicited input may also be received via e-mail, web-based callback and chat interaction in the form of questionnaires that are screen-based. For example, such questionnaires can be automatically generated by the system as described earlier in the form of JSP, CGI, or HTML-based documents which are then associated with a specific project and thus a specific media type for the customer interaction.

Customers may provide their own input on KPI measures based on interaction with the network contact center. Such input may be accommodated in a plurality of media types. For example, customers may provide spoken or touch-tone input during an automated IVR-based telephone call. Such input may be further used to dynamically route the interaction so the customer can get customized treatment during that interaction—or the data may be stored and used as a means to route and treat subsequent interactions—or that data may be used to act both on the current interaction and also subsequent interactions. Such customer-solicited input may also be gotten with interactions with e-mails, web-based callback and chat interaction in the form of questionnaires that are screen-based. For example, such questionnaires can be automatically generated by the system as described earlier in the form of JSP, CGI, or HTML-based documents which are then associated with a specific project and thus a specific media type for the customer interaction.

Figure 14:
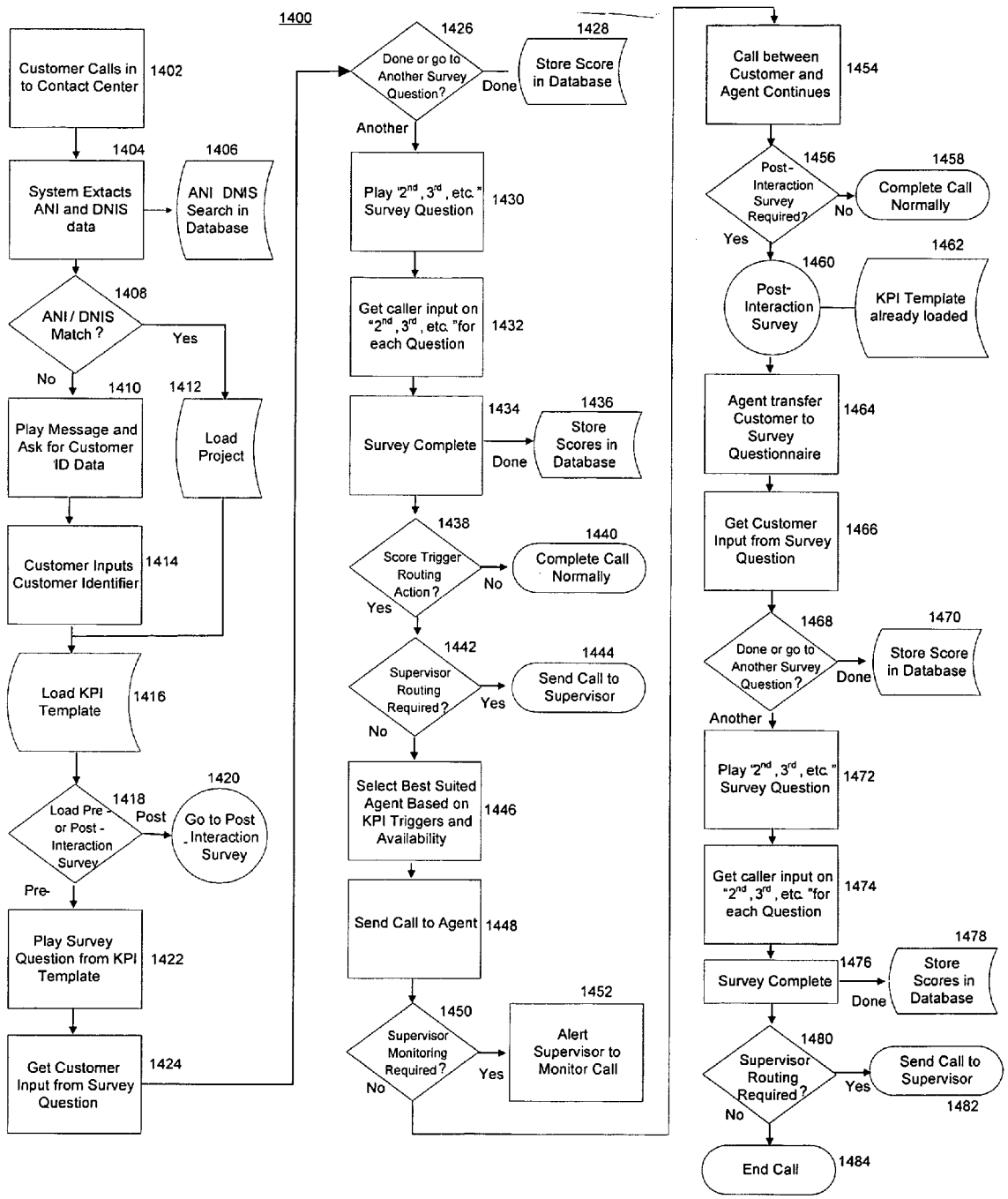
FIG. 14 illustrates a process of scoring phone call KPI by a customer according to an embodiment of the invention.

Referring to FIG. 14, a process 1400 of scoring phone call KPI by a customer is implemented according to an embodiment of the invention. Beginning at step 1402, when a customer calls in to the Contact Center, the system extracts ANI and DNIS data (step 1404) where the ANI/DNIS is searched in a database (step 1406). If the ANI/DNIS data does not match, the system plays a message and asks the customer for their ID data (step 1410). The customer must then manually enter their ID data (step 1414). In the case where the ANI/DNIS data match, the system proceeds to load the project (step 1412). Next, the KPI template is loaded (step 1416). The customer is then queried to load an interaction survey (step 1418). If the customer selects the Post-Interaction survey, the customer proceeds to the Post Interaction survey process (step 1420). If the customer selects the Pre-Interaction survey, a survey question is played from the KPI Template (step 1422) following a request for customer input from the survey question (step 1424).

Following the customer input to the survey question, the customer is then queried for another survey (step 1426). If the customer decides to end the survey, the scores are stored in a database (step 1428). If the customer opts for additional survey questions, additional survey questions are played back to the customer (step 1430). For each survey question presented to the customer, the customer input is requested (step 1432). Once all additional survey questions are done, the survey is complete (step 1434) and the scores are stored in the database (step 1436). The score value is then compared to a score trigger value where additional routing may be required (step 1438). If no score trigger is initiated, the call is completed normally (step 1440). However, if the score trigger is initiated, additional routing action is required where the call is sent to the supervisor routing (1442) for further action. At the supervisor routing step (step 1442), if routing is determined to be required, the call is sent to the supervisor (step 1444). Otherwise, the call is sent to the best suited again based on KPI Triggers and availability (step 1446). Once a call is routed to an appropriate agent (step 1448), supervisor monitoring is either required or not depending on caller's response (step 1450). If supervisor monitoring is required, then an alert is sent to supervisor to monitor the call (step 1452). If no monitoring is required, the call between the customer and Agent continues (step 1454).

Towards the end of the call between the customer and Agent (step 1454), the customer is queried on whether to participate in a post interactive survey (step 1456). If the customer opts not to participate, the call is completed normally (step 1458). Otherwise, the call is sent to the post interaction survey (step 1460) where the KPI Template is loaded (step 1462). At this time, the Agent transfers the customer to the survey question (step 1464) so that the customer may input their responses from the survey questions (step 1466). Following the customer input to the survey question, the customer is then queried for another survey (step 1468). If the customer decides to end the survey, the scores are stored in a database (step 1470). If the customer opts for additional survey questions, additional survey questions are played back to the customer (step 1472). For each survey question presented to the customer, the customer input is requested (step 1474). Once all additional survey questions are done, the survey is complete (step 1476) and the scores are stored in the database (step 1478). At the supervisor routing step (step 1480), if routing is determined to be required, the call is sent to the supervisor (step 1482). Otherwise, the call ends (step 1484).

Figure 15:
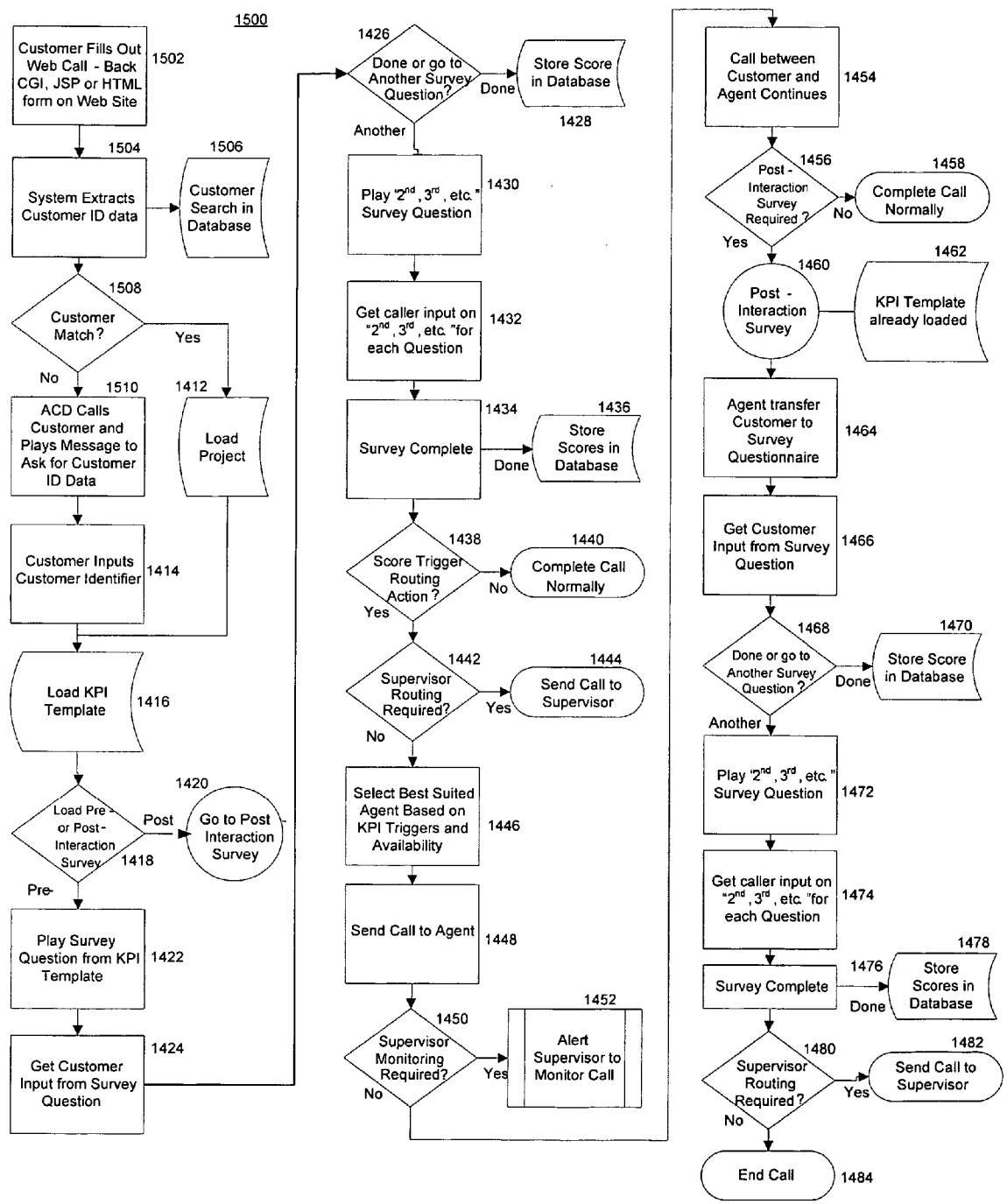
FIG. 15 illustrates a process of scoring Web CallBack KPI by a customer according to an embodiment of the invention.

Referring to FIG. 15, a process 1500 of scoring Web Call-Back KPI by a customer is implemented according to an embodiment of the invention. Beginning at step 1502, when a customer fills out a Web Call Back CGI, JSP or HTML form on the Web Site, the system extracts the customer ID data (step 1504) where the data is searched in a database (step 1506). The system checks whether or not the customer data matches the data found in the database (step 1508). If the customer data does not match, the system plays a message and asks the customer for their ID data (step 1510). The customer must then manually enter their ID data (step 1414). In the case where the customer data match, the system proceeds to load the project (step 1412). Next, the KPI template is loaded (step 1416). The customer is then queried to load an interaction survey (step 1418). If the customer selects the Post-Interaction survey, the customer proceeds to the Post Interaction survey process (step 1420). If the customer selects the Pre-Interaction survey, a survey question is played from the KPI Template (step 1422) following a request for customer input from the survey question (step 1424).

Following the customer input to the survey question, the customer is then queried for another survey (step 1426). If the customer decides to end the survey, the scores are stored in a database (step 1428). If the customer opts for additional survey questions, additional survey questions are played back to the customer (step 1430). For each survey question presented to the customer, the customer input is requested (step 1432). Once all additional survey questions are done, the survey is complete (step 1434) and the scores are stored in the database (step 1436). The score value is then compared to a score trigger value where additional routing may be required (step 1438). If no score trigger is initiated, the call is completed normally (step 1440). However, if the score trigger is initiated, additional routing action is required where the call is sent to the supervisor routing (1442) for further action. At the supervisor routing step (step 1442), if routing is determined to be required, the call is sent to the supervisor (step 1444). Otherwise, the call is sent to the best suited again based on KPI Triggers and availability (step 1446). Once a call is routed to an appropriate agent (step 1448), supervisor monitoring is either required or not depending on caller's response (step 1450). If supervisor monitoring is required, then an alert is sent to supervisor to monitor the call (step 1452). If no monitoring is required, the call between the customer and Agent continues (step 1454).

Towards the end of the call between the customer and Agent (step 1454), the customer is queried on whether to participate in a post interactive survey (step 1456). If the customer opts not to participate, the call is completed normally (step 1458). Otherwise, the call is sent to the post interaction survey (step 1460) where the KPI Template is loaded (step 1462). At this time, the Agent transfers the customer to the survey question (step 1464) so that the customer may input their responses from the survey questions (step 1466). Following the customer input to the survey question, the customer is then queried for another survey (step 1468). If the customer decides to end the survey, the scores are stored in a database (step 1470). If the customer opts for additional survey questions, additional survey questions are played back to the customer (step 1472). For each survey question presented to the customer, the customer input is requested (step 1474). Once all additional survey questions are done, the survey is complete (step 1476) and the scores are stored in the database (step 1478). At the supervisor routing step (step 1480), if routing is determined to be required, the call is sent to the supervisor (step 1482). Otherwise, the call ends (step 1484).

Figure 16:
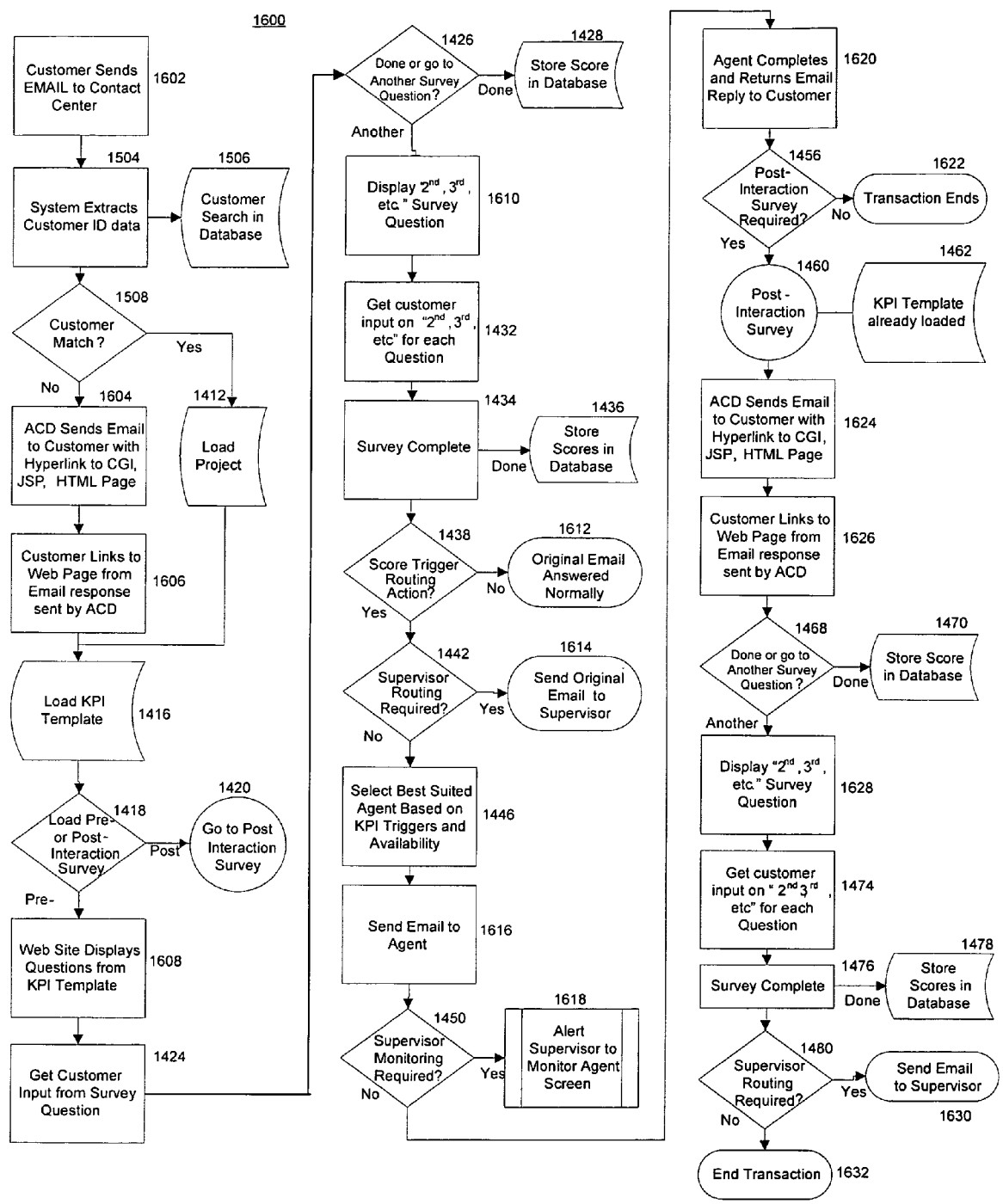
FIG. 16 illustrates a process of scoring ACD email KPI by a customer according to an embodiment of the invention.

Referring to FIG. 16, a process 1600 of scoring ACD Email KPI by a customer is implemented according to an embodiment of the invention. Beginning at step 1602, when a customer sends Email to the Contact Center, the system extracts the customer ID data (step 1504) where the data is searched in a database (step 1506). The system checks whether or not the customer data matches the data found in the database (step 1508). If the customer data does not match, the ACD sends Email to the customer with hyperlink to CGI, JSP, HTML page (step 1604). The customer links to web page from Email response sent by ACD (step 1606). In the case where the customer data match, the system proceeds to load the project (step 1412). Next, the KPI template is loaded (step 1416). The customer is then queried to load an interaction survey (step 1418). If the customer selects the Post-Interaction survey, the customer proceeds to the Post Interaction survey process (step 1420). If the customer selects the Pre-Interaction survey, the web site displays questions from the KPI template (step 1608) following a request for customer input from the survey question (step 1424).

Following the customer input to the survey question, the customer is then queried for another survey (step 1426). If the customer decides to end the survey, the scores are stored in a database (step 1428). If the customer opts for additional survey questions, additional survey questions are displayed back to the customer (step 1610). For each survey question presented to the customer, the customer input is requested (step 1432). Once all additional survey questions are done, the survey is complete (step 1434) and the scores are stored in the database (step 1436). The score value is then compared to a score trigger value where additional routing may be required (step 1438). If no score trigger is initiated, the original Email is answered normally (step 1612). However, if the score trigger is initiated, additional routing action is required where the Email is sent to the supervisor routing (1442) for further action. At the supervisor routing step (step 1442), if routing is determined to be required, the original Email is sent to the supervisor (step 1614). Otherwise, the Email is sent to the best suited again based on KPI Triggers and availability (step 1446). Once a Email is routed to an appropriate agent (step 1616), supervisor monitoring is either required or not depending on Agent's response (step 1450). If supervisor monitoring is required, then an alert is sent to supervisor to monitor the Agent screen (step 1618). If no monitoring is required, the transaction between the customer and Agent continues (step 1620).

Towards the end of the transaction between the customer and Agent (step 1620), the customer is queried on whether to participate in a post interactive survey (step 1456). If the customer opts not to participate, the transaction ends (step 1622). Otherwise, the transaction is sent to the post interaction survey (step 1460) where the KPI Template is loaded (step 1462). At this time, the ACD sends Email to the customer with hyperlink to CGI, JSP, HTML page (step 1624) so that the customer may link to web page from Email response sent by ACD (step 1626). Following the customer input to the survey question, the customer is then queried for another survey (step 1468). If the customer decides to end the survey, the scores are stored in a database (step 1470). If the customer opts for additional survey questions, additional survey questions are displayed back to the customer (step 1628). For each survey question presented to the customer, the customer input is requested (step 1474). Once all additional survey questions are done, the survey is complete (step 1476) and the scores are stored in the database (step 1478). At the supervisor routing step (step 1480), if routing is determined to be required, the Email is sent to the supervisor (step 1630). Otherwise, the transaction ends (step 1632).

Figure 17:
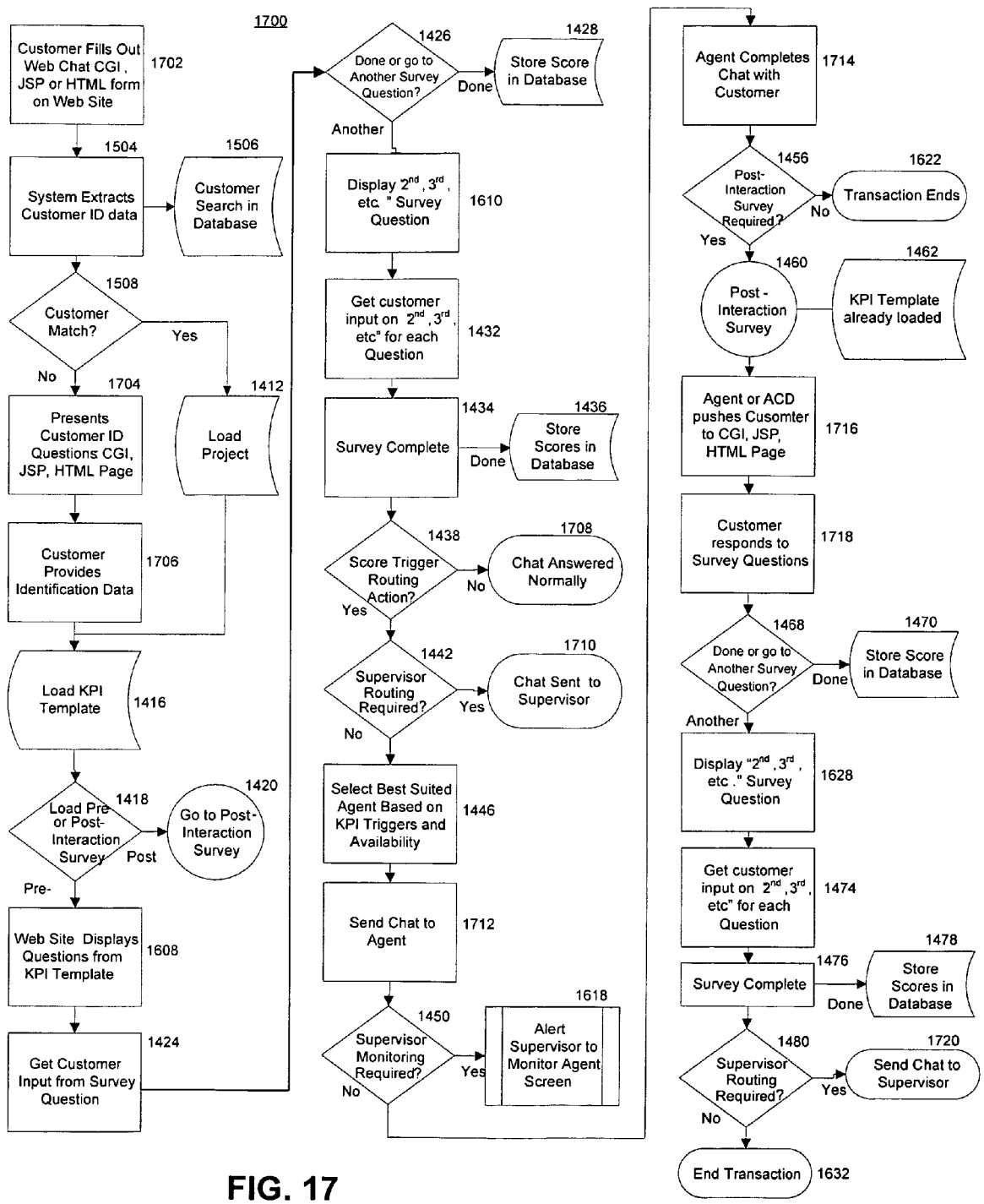
FIG. 17 illustrates a process of scoring ACD chat KPI by a customer according to an embodiment of the invention.

Referring to FIG. 17, a process 1700 of scoring ACD chat KPI by a customer is implemented according to an embodiment of the invention. Beginning at step 1702, when a customer fills out a web chat CGI, JSP or HTML from web site, the system extracts the customer ID data (step 1504) where the data is searched in a database (step 1506). The system checks whether or not the customer data matches the data found in the database (step 1508). If the customer data does not match, the system presents Customer ID questions on CGI, JSP, HTML page (step 1704). The customer inputs identification data (step 1706). In the case where the customer data match, the system proceeds to load the project (step 1412). Next, the KPI template is loaded (step 1416). The customer is then queried to load an interaction survey (step 1418). If the customer selects the Post-Interaction survey, the customer proceeds to the Post Interaction survey process (step 1420). If the customer selects the Pre-Interaction survey, the web site displays questions from the KPI template (step 1608) following a request for customer input from the survey question (step 1424).

Following the customer input to the survey question, the customer is then queried for another survey (step 1426). If the customer decides to end the survey, the scores are stored in a database (step 1428). If the customer opts for additional survey questions, additional survey questions are displayed back to the customer (step 1610). For each survey question presented to the customer, the customer input is requested (step 1432). Once all additional survey questions are done, the survey is complete (step 1434) and the scores are stored in the database (step 1436). The score value is then compared to a score trigger value where additional routing may be required (step 1438). If no score trigger is initiated, the chat is answered normally (step 1708). However, if the score trigger is initiated, additional routing action is required where the chat is sent to the supervisor routing (1442) for further action. At the supervisor routing step (step 1442), if routing is determined to be required, the chat is sent to the supervisor (step 1710). Otherwise, the chat is sent to the best suited again based on KPI Triggers and availability (step 1446). Once a chat is routed to an appropriate agent (step 1712), supervisor monitoring is either required or not depending on Agent's response (step 1450). If supervisor monitoring is required, then an alert is sent to supervisor to monitor the Agent screen (step 1618). If no monitoring is required, the chat between the customer and Agent continues (step 1714).

Towards the end of the chat session between the customer and Agent (step 1714), the customer is queried on whether to participate in a post interactive survey (step 1456). If the customer opts not to participate, the transaction ends (step 1622). Otherwise, the transaction is sent to the post interaction survey (step 1460) where the KPI Template is loaded (step 1462). At this time, the ACD pushes customer to CGI, JSP, HTML page (step 1716) so that the customer may respond to survey questions (step 1718). Following the customer input to the survey question, the customer is then queried for another survey (step 1468). If the customer decides to end the survey, the scores are stored in a database (step 1470). If the customer opts for additional survey questions, additional survey questions are displayed back to the customer (step 1628). For each survey question presented to the customer, the customer input is requested (step 1474). Once all additional survey questions are done, the survey is complete (step 1476) and the scores are stored in the database (step 1478). At the supervisor routing step (step 1480), if routing is determined to be required, the chat is sent to the supervisor (step 1720). Otherwise, the transaction ends (step 1632).

The present invention provides a service creation environment for defining key performance indicators and templates, and automatically generating stored templates for different media types. The process of defining indicators and templates is provided in a user-friendly interface such that it is easy and repeatable. Further, the creation of a single template and associated logic generates many views of that logic, e.g., IVR, CGI, Web CallBack, etc. The service creation environment gives the administrator the ability to choose dynamic vs. static indicators and linkage to a plurality of media types. Furthermore, KPI templates are portable among call center systems.

Surveys can be triggered before, during, or after the call by the KPI templates and associated logic. Moreover, more than one survey can be conducted before, during, and/or after the call.

It would be further advantageous for administrative software to store the creation of such templates in such a way that they automatically generated scripts for use in live interactions of a phone call or chat or e-mail or web call back request. For example, it would be of great labor-saving utility if a template, once created for a phone call logic flow—to automatically generate a Voice Extended Markup Language-based (VXML) script so a phone-based IVR questionnaire dialog and logic flow could automatically be stored and used on demand. It would also be of great benefit for a contact center practitioner to automatically generate other manifestations of a KPI template such as JSP (Java Server Page), CGI (Common Gateway Interface), or HTML (Hypertext Markup Language) scripts and associated software so these could be automatically used on demand for e-mail content, web page content and chat page content for the same purpose of facilitating input from customers.

Another aspect of dealing with customer satisfaction is the ability to anticipate the likes, dislikes and opinion of a customer before an interaction takes place. It would be advantageous to take proactive action on the routing of a phone call or e-mail or chat or web-call back request based on input at the beginning of the transactions. A survey done at the beginning of a transaction could be used to solicit input regarding a previous transaction or even a general opinion from the caller in order to better serve the customer before agent intervention. It may also be advantageous to fully automate the call based on certain input from the customer if he or she wishes not to speak to an operator or agent.

A matrix of KPI-like application to customer service interactions could be used to further interact or qualify customer interactions that go beyond the customer's opinion of treatment by an agent or overall satisfaction. The same discipline could also be applied to soliciting input from dealers or a field sales force concerning the performance of a certain product or the collection of more common survey data that has no relation to the performance of an agent. Such a means of collection which could be fully or partially automated would be advantageous in routing dealers or field sales agents to experts on product support or to peers for assistance in installations or other matters dealing with a far-flung workforce.

Another aspect of the invention is the linkage between KPI scores and the skills and level of proficiency of agents. It would be advantageous to correlate the KPI scores resulting from both customer and supervisor input with specific agents' skills. Further, it would be advantageous to correlate the weight assigned to KPI scores with the proficiency level of agents' skills. Such skills-based data can be used to dynamically route subsequent interactions based on the historical performance of any agent. It would be further advantageous for the administrator of the system to be able to select a time range associated with both customer and supervisor input to take into account how far back the system will consider the correlation of agent skills with the KPI data. This embodiment of the invention represents an aspect of administration (agent skill updates) which can be accomplished automatically or semi-automatically.

Other embodiments and uses of the invention will be apparent to those skilled in the art from consideration of the specification and practice of the invention disclosed herein. Although the invention has been particularly shown and described with reference to several preferred embodiments thereof, it will be understood by those skilled in the art that various changes in form and details may be made therein without departing from the spirit and scope of the invention as defined in the appended claims.

The invention claimed is:

1. A method for providing a key performance indicator (KPI) template for use in a call center, the method comprising:
   executing, via a user interface, KPI template represented by a plurality of scripts saved in a database,
      wherein the KPI template specifies an association of KPIs, scores on the KPIs, and score-based triggers and routing rules for routing to a different agent or for a supervisor intervention, and
      wherein the KPI template is linked to a logic flow of transactions across a plurality of media types, where each media type represents a type of interaction between a user and the call center using a particular media;
   generating, via the scripts in the database, user interface views based on the logic flow of a said media type used during an interaction between the user and the call center;
   receiving inputs from the user through the user interface views, the inputs comprising one or more scores on a performance metric of a said KPI, wherein the scores are based on performance of an agent during the interaction;
   updating skills and skill proficiency of the agent based on the scores;

using the KPI template to dynamically route the interaction to a different agent or a supervisor for further intervention when a said trigger or routing rule is activated.

2. The method of claim 1, wherein the user interface views are generated as part of a survey with all requisite linkages to a call center system.

3. The method of claim 2, wherein said survey comprises an element selected from a group consisting of a HTML page, a JSP page, a VXML page, a CGI script, a Chat page, and a combination thereof.

4. The method of claim 1, further comprising:
presenting to the user an interface that facilitates adding a KPI to the KPI template;
receiving inputs generated by the user using one or more input devices, the inputs being responsive to prompts from the interface and the inputs comprising
a KPI,
a scoring level for said key performance indicator,
a weight associated with said key performance indicator, and
assigning said performance metric to said key performance indicator.

5. The method of claim 1, wherein said plurality of media types include a phone/IVR call, a web callback, an email, and a chat.

6. The method of claim 1, wherein said inputs comprise a spoken or touch-tone input.

7. The method of claim 1, further comprising the step of storing said inputs for routing subsequent call interactions with said user.

8. The method of claim 1, wherein said inputs comprise data received via an email, web-based callback, or a chat interaction.

9. The method of claim 1, further comprising:
receiving a score that reflects the supervisor's input in ascertaining the performance of the agent.

10. A system to provide a key performance indicator (KPI) template in a call center, comprising:
one or more processors;
one or more servers that runs on the one or more processors, wherein the one or more servers operate to perform the steps comprising
executing, via a user interface, KPI template represented by a plurality of scripts saved in a database,
wherein the KPI template specifies an association of KPIs, scores on the KPIs, and score-based triggers and routing rules for routing to a different agent or for a supervisor intervention, and
wherein the KPI template is linked to a logic flow of transactions across a plurality of media types, where each media type represents a type of interaction between a user and the call center using a particular media,
generating, via the scripts in the database, user interface views based on the logic flow of a said media type used during an interaction between the user and the call center,
receiving inputs from the user through the user interface views, the inputs comprising one or more scores on a performance metric of a said KPI, wherein the scores are based on performance of an agent during the interaction,
updating skills and skill proficiency of the agent based on the scores,
using the KPI template to dynamically route the interaction to a different agent or a supervisor for further intervention when a said trigger or routing rule is activated.

11. The method of claim 1, further comprising:
loading the KPI template separately for the supervisor when the supervisor selects to score the interaction with the user.

12. The system of claim 10, wherein the user interface views are generated as part of a survey with all requisite linkages to a call center system.

13. The system of claim 10, wherein said survey comprises an element selected from a group consisting of a HTML page, a JSP page, a VXML page, a CGI script, a Chat page, and a combination thereof.

14. The system of claim 10, further comprising:
presenting to the user interface that facilitates adding a KPI to the KPI template;
receiving inputs generated by the user using one or more input devices, the inputs being responsive to prompts from the interface and the inputs comprising
a key performance indicator,
a scoring level for said key performance indicator,
a weight associated with said key performance indicator, and assigning said performance metric to said key performance indicator.

15. The system of claim 10, wherein said plurality of media types include a phone/IVR call, a web callback, an email, and a chat.

16. The system of claim 10, wherein the system receives a score that reflects the supervisor's input in ascertaining the performance of the agent.

* * * * *

UNITED STATES PATENT AND TRADEMARK OFFICE
CERTIFICATE OF CORRECTION

PATENT NO. : 8,885,812 B2
APPLICATION NO. : 11/376486
DATED : November 11, 2014
INVENTOR(S) : Margulies et al.

It is certified that error appears in the above-identified patent and that said Letters Patent is hereby corrected as shown below:

On the Title Page,

On page 2, column 2, under U.S. Patent Documents, line 21, below "Gallick et al." and insert -- 6798876 09/2004 Bala --.

On page 3, column 1, under Other Publications, line 17, delete "Dordrechnt," and insert -- Dordrecht, --, therefor.

On page 3, column 2, under Other Publications, line 21, delete "Redifining" and insert -- Redefining --, therefor.

On page 3, column 2, under Other Publications, line 36, delete "Inbout" and insert -- Inbound --, therefor.

In the Drawings,

On sheet 8 of 17, in figure 8, under Reference Numeral 824, line 3, delete "Permormance" and insert -- Performance --, therefor.

On sheet 8 of 17, in figure 8, under Reference Numeral 870, line 3, delete "Cusotmer" and insert -- Customer --, therefor.

On sheet 10 of 17, in figure 10, under Reference Numeral 922, line 2, delete "Be Be" and insert -- Be --, therefor.

On sheet 10 of 17, in figure 10, under Reference Numeral 940, line 3, delete "Attribures" and insert -- Attributes --, therefor.

Signed and Sealed this
Thirtieth Day of June, 2015

Michelle K. Lee
*Director of the United States Patent and Trademark Office*

CERTIFICATE OF CORRECTION (continued)
U.S. Pat. No. 8,885,812 B2

On sheet 14 of 17, in figure 14, under Reference Numeral 1404, line 1, delete "Extacts" and insert -- Extracts --, therefor.

On sheet 17 of 17, in figure 17, under Reference Numeral 1716, line 2, delete "Cusomter" and insert -- Customer --, therefor.